(12) United States Patent
Leyrer et al.

(10) Patent No.: US 7,767,748 B2
(45) Date of Patent: Aug. 3, 2010

(54) AQUEOUS POLYMER DISPERSIONS CONTAINING AMPHIPHILIC BLOCK COPOLYMERS, METHOD FOR PRODUCING SAID DISPERSIONS AND THE USE THEREOF

(75) Inventors: Reinhold J. Leyrer, Dannstadt-Schauernheim (DE); Ingolf Kuehn, Obersuelzen (DE); Darijo Mijolovic, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 793 days.

(21) Appl. No.: 10/586,682

(22) PCT Filed: Feb. 8, 2005

(86) PCT No.: PCT/EP2005/001231

§ 371 (c)(1),
(2), (4) Date: Jul. 20, 2006

(87) PCT Pub. No.: WO2005/077991

PCT Pub. Date: Aug. 25, 2005

(65) Prior Publication Data

US 2008/0242790 A1    Oct. 2, 2008

(30) Foreign Application Priority Data

Feb. 13, 2004    (DE)    ........................ 10 2004 007 501

(51) Int. Cl.
C08F 2/16 (2006.01)
A61K 9/16 (2006.01)
C07C 37/00 (2006.01)

(52) U.S. Cl. ........................ 524/459; 524/543; 524/800; 568/792

(58) Field of Classification Search ................ 524/543, 524/800, 459; 568/792
See application file for complete search history.

(56) References Cited

U.S. PATENT DOCUMENTS

| 5,300,701 | A | 4/1994 | Cherpeck | |
|---|---|---|---|---|
| 6,677,293 | B1 * | 1/2004 | Allgaier et al. | 510/417 |
| 2003/0129151 | A1 * | 7/2003 | Candau et al. | 424/59 |
| 2003/0225168 | A1 * | 12/2003 | Deroo et al. | 516/77 |
| 2004/0007153 | A1 | 1/2004 | Thetford et al. | |
| 2004/0171759 | A1 * | 9/2004 | Lange et al. | 525/192 |
| 2005/0090611 | A1 * | 4/2005 | Huffer et al. | 524/800 |

FOREIGN PATENT DOCUMENTS

| DE | 43 19 671 | 12/1994 |
|---|---|---|
| DE | 43 19 672 | 12/1994 |
| DE | 43 25 237 | 2/1995 |
| DE | 195 19 042 | 11/1996 |
| DE | 100 03 105 | 7/2001 |
| DE | 101 25 158 | 12/2002 |
| DE | 102 43 361 | 4/2004 |
| DE | 103 21 734 | 12/2004 |
| EP | 0 156 310 | 10/1985 |
| EP | 0 476 785 | 3/1992 |
| EP | 0 743 962 | 11/1996 |
| JP | 9 272796 | 10/1997 |
| WO | 86 00081 | 1/1986 |
| WO | 87 00856 | 2/1987 |
| WO | 87 00857 | 2/1987 |
| WO | 90 03359 | 4/1990 |
| WO | 95 07944 | 3/1995 |
| WO | 97 03946 | 2/1997 |
| WO | 97 41178 | 11/1997 |
| WO | 01 25293 | 4/2001 |
| WO | 01 25294 | 4/2001 |
| WO | 01 30882 | 5/2001 |
| WO | 01 55059 | 8/2001 |
| WO | 01 70830 | 9/2001 |
| WO | 02 26840 | 4/2002 |

* cited by examiner

Primary Examiner—Ling-Siu Choi
Assistant Examiner—Hui Chin
(74) Attorney, Agent, or Firm—Oblon, Spivak, McClelland, Maier & Neustadt, L.L.P.

(57) ABSTRACT

Aqueous polymer dispersions which are obtainable by emulsion polymerization of ethylenically unsaturated monomers in an aqueous medium in the presence of free radical polymerization initiators and stabilizers, amphiphilic polymers which comprise one or more hydrophobic units (A) and one or more hydrophilic units (B) being used as the stabilizer before, during or after the polymerization, and the hydrophobic units (A) being formed from a polyisobutene block, at least 50 mol % of whose polyisobutene macromolecules have terminally arranged doubled bonds, processes for the preparation of the aqueous polymer dispersions by polymerizing ethylenically unsaturated monomers in the presence of free radical initiators and said amphiphilic polymers, which are used before, during or after the polymerization, and the use of the resulting aqueous polymer dispersions as associative thickeners in paper coating slips, in textile production, as thickeners for textile print pastes, in the pharmaceutical and cosmetics sector, for surface coatings, for detergents and cleaning agents, in foods and as oil field chemicals.

45 Claims, No Drawings

AQUEOUS POLYMER DISPERSIONS CONTAINING AMPHIPHILIC BLOCK COPOLYMERS, METHOD FOR PRODUCING SAID DISPERSIONS AND THE USE THEREOF

The present invention relates to aqueous polymer dispersions comprising amphiphilic block copolymers, processes for their preparation by emulsion polymerization of ethylenically unsaturated monomers in an aqueous medium in the presence of free radical polymerization initiators and stabilizers and the use of these dispersions as associative thickeners in paper coating slips, in textile production, as thickeners for textile print pastes, in the pharmaceutical and cosmetics sector, for surface coatings, for detergents and cleaning agents, in foods and as oil field chemicals.

WO-A-86/00081 discloses reaction products which are prepared by reacting $C_8$- to $C_{30}$-alkenylsuccinic acid or $C_8$- to $C_{30}$-alkenylsuccinic anhydride with at least one water-soluble polyalkylene glycol. The reaction products are used as thickeners for aqueous liquids.

WO-A-87/00857 discloses reaction products which are obtainable by reacting $C_8$- to $C_{40}$-alkyl- or alkenylsuccinic acid or the corresponding anhydrides with polyalkylene glycols terminated with amino groups. These reaction products are used as thickeners for hydraulic fluids. The reaction products of polyalkylene glycols carrying $C_8$- to $C_{40}$-alkyl or amino terminal groups and at least one surface-active agent, which reaction products are disclosed in WO-A-87/00856, are also used as thickeners in hydraulic fluids.

JP-A-09272796 describes associative thickeners which are prepared by reacting alkyl- or alkenylsuccinic anhydrides which have 6 to 25 carbon atoms in the alkyl or alkenyl group with polyethylene glycols carrying terminal amino groups (PEO-diamines).

WO-A-97/41178 discloses aqueous dispersions which comprise a reaction product of a $C_{14}$- to $C_{22}$-alkenyl- or alkylsuccinic anhydride and a polyethylene glycol or a polyethylene glycol monoalkyl ether as a dispersant. The reaction products are also used as dispersants for the preparation of dispersions of finely divided pigments in water and a preferably water-insoluble resin based on acrylates, styrene/acrylates, polyesters, polyurethanes and acrylates/polyurethanes.

WO-A-01/30882 discloses polyesters which comprise 2 to 100 units of block copolymers of the type A-B, where A is a radical of a poly-$C_{2-6}$-alkylene glycol containing at least 80% by weight of polyethylene glycol and B is a radical of a $C_{4-50}$-alk(en)ylsuccinic acid. They are prepared by esterifying block copolymers of the formula HO-A-B—COOH, where A and B have the abovementioned meanings, and are used as associative thickeners in aqueous media, such as surface coatings and inks.

DE-A-101 25 158 discloses two-block emulsifiers which can be prepared, for example, by reacting a succinic anhydride substituted by a polyisobutylene group with polar reactants, such as alkanolamines, polyamines, oligoalcohols, polyols, oligoalkylene glycols, polyalkylene glycols, carbohydrates and sugars. The reaction products are used as emulsifiers for water-in-oil emulsions, as additives in fuels and lubricants, as corrosion-inhibiting additives in water-containing liquids, and as dispersants in inorganic and organic solids dispersions. They can also be used as surfactants in detergents and cleaning agents.

The prior German Application 103 21 734.7 likewise discloses block copolymers which are prepared by reacting a succinic anhydride substituted by a polyisobutylene group with polyalkylene glycols blocked at one end by a terminal group. These reaction products are used as emulsifiers, as lubricant additives in fuels, lubricants or engine oils, in metal processing, electrochemistry, paper chemistry and leather processing, in surface coatings or finishes, in water-based adhesives or as auxiliary surfactants or cosurfactants.

Polymer dispersions which are widely used in the paper industry as binders for pigments and for thickening paper coating slips are also known, cf. the grades Acronal®, Styronal® and Acrosol® from BASF Aktiengesellschaft, Ludwigshafen.

It is an object of the present invention to provide novel products as associative thickeners in paper coating slips, in textile production, in the pharmaceutical and cosmetics sector, for surface coatings, for detergents and cleaning agents, in foods and oil field chemicals, the products having an improved water retention and thickening effect, in particular a high shear dilution, compared with the known binder dispersions and thickeners, i.e. the products imparting a low viscosity under the action of high shear forces to the mixture comprising the novel dispersion and thickening it immediately after the end of shearing.

We have found that this object is achieved, according to the invention, by aqueous polymer dispersions which are obtainable by emulsion polymerization of ethylenically unsaturated monomers in an aqueous medium in the presence of free radical polymerization initiators and stabilizers if amphiphilic polymers which comprise one or more hydrophobic units (A) and one or more hydrophilic units (B) are used as a stabilizer before, during or after the polymerization, the hydrophobic units (A) being formed from a polyisobutene block, at least 50 mol % of whose polyisobutene macromolecules have terminally arranged double bonds.

It has surprisingly been found that amphiphilic polymers having the structure defined above are particularly suitable as stabilizers for the preparation of dispersions having an associative thickening effect. The present invention therefore also relates to a process for the preparation of the aqueous polymer dispersions by polymerization of ethylenically unsaturated monomers in aqueous medium in the presence of free radical polymerization initiators and at least one stabilizer by an emulsion polymerization method, wherein amphiphilic polymers which comprise one or more hydrophobic units (A) and one or more hydrophilic units (B) are used as a stabilizer before, during or after the polymerization, the hydrophobic units (A) being formed from a polyisobutene block, at least 50 mol % of whose polyisobutene macromolecules have terminally arranged double bonds.

In an economically advantageous manner, the stabilizers can be prepared on the basis of industrial starting substances and by reaction routes realizable on an industrial scale. The amphiphilic polymers are as a rule industrial mixtures of substances having a more or less broad molecular weight distribution.

Preferably, every hydrophobic unit (A) is formed from a polyisobutene block.

Polyisobutenes which correspond to the above definition, i.e. at least 50 mol % of which are formed from macromolecules having terminally arranged double bonds, are referred to as reactive polyisobutenes. The term terminally arranged double bond is understood as meaning both β-olefinic (vinyl) double bonds —[—CH=C(CH$_3$)$_2$] and α-olefinic (vinylidene) double bonds —[—C(CH$_3$)=CH$_2$]. Preferred reactive polyisobutenes are those in which at least 60, preferably at least 80, mol %, based on the total number of the polyisobutene macromolecules, of the polyisobutene macromolecules have terminally arranged double bonds.

Suitable reactive polyisobutenes can be obtained, for example, by cationic polymerization of isobutene.

For the synthesis of suitable polyisobutenes, pure isobutene is preferably used. However, it is also possible to use cationically polymerizable comonomers. However, the amount of comonomers should as a rule be less than 20, preferably less than 10, in particular less than 5, % by weight.

Particularly suitable cationically polymerizable comonomers are vinylaromatics, such as styrene and α-methylstyrene, $C_1$-$C_4$-alkylstyrenes and 2-,3- and 4-methylstyrene and 4-tert-butylstyrene, $C_3$- to $C_6$-alkenes, such as n-butene, isoolefins of 5 to 10 carbon atoms, such as 2-methylbut-1ene, 2-methylpen-1-ene, 2-methylhex-1-ene, 2-ethylpent-1-ene, 2-ethylhex-1-ene and 2-propylhept-1-ene.

Suitable isobutene-containing starting materials for the novel process are both isobutene itself and isobutene-containing $C_4$-hydrocarbon streams, for example refined $C_4$ fractions, $C_4$ cuts from isobutane dehydrogenation, $C_4$ cuts from steam crackers or FCC crackers (FCC: fluid catalyzed cracking), provided that they have been substantially freed from 1,3-butadiene present therein. Typically, the concentration of isobutene in $C_4$-hydrocarbon streams is from 40 to 60% by weight.

Suitable $C_4$-hydrocarbon streams should as a rule comprise less than 500 ppm, preferably less than 200 ppm, of 1,3-butadiene. The presence of 1-butene and cis- and trans-2-butene is substantially noncritical for the polymerization and does not lead to reduced selectivities.

With the use of $C_4$-hydrocarbon streams as starting material, the hydrocarbons other than isobutene play the role of an inert solvent or are incorporated in the form of polymerized comonomer units.

Suitable solvents are all organic compounds which are liquid in the chosen temperature range of the preparation of the polyisobutene and neither eliminate protons nor have free electron pairs.

Examples are in particular cyclic and acyclic alkanes, such as ethane, isopropane, n-propane, n-butane and its isomers, cyclopentane and n-pentane and its isomers, cyclohexane and n-hexane and its isomers, n-heptane and its isomers and higher homologs, cyclic and acyclic alkenes, such as ethene, isopropene, n-propene, n-butene, cyclopentene and n-pentene, cyclohexene and n-hexene, and n-heptene, aromatic hydrocarbons, such as benzene, toluene or isomeric xylenes. The hydrocarbons may also be halogenated. Examples of halogenated hydrocarbons comprise methyl chloride, methyl bromide, methylene chloride, methylene bromide, ethyl chloride, ethyl bromide, 1,2-dichloroethane, 1,1,1-trichloroethane, chloroform or chlorobenzene. Mixtures of the solvents may also be used, provided that no undesired properties occur.

In terms of process engineering, it is particularly advisable to use solvents which boil in the desired temperature range. The polymerization is usually effected at from −80 to 0° C., preferably from −50 to −5° C., particularly preferably from −30 to −15° C.

$BF_3$, its complexes with electron donors or mixtures thereof may be used as a catalyst. Electron donors (Lewis bases) are compounds which have a free electron pair, for example on an O, N, P or S atom, and can form complexes with Lewis acids. This complex formation is desired in many cases since the activity of the Lewis acid is thus reduced and secondary reactions are suppressed. Examples of suitable electron donors are ethers, such as diisopropyl ether or tetrahydrofuran, amines, such as triethylamine, amides, such as dimethylacetamide, alcohols, such as methanol, ethanol, isopropanol or tert-butanol. The alcohols also act as a proton source and thus initiate the polymerization. A cationic polymerization mechanism can also become active via protons from ubiquitous traces of water.

The cationic polymerization under $BF_3$— catalysis gives substantially linear polyisobutenes which have a particularly high content of α-olefin groups at a chain end. With a suitable reaction procedure, the α-olefin content is not less than 80%.

Reactive polyisobutenes which have reactive α-olefin groups at both chain ends or which are branched can be obtained in a particularly elegant manner by means of living cationic polymerization. However, linear polyisobutenes which have an α-olefin group only at one chain end can of course also be synthesized by this method.

In a living cationic polymerization, isobutene is polymerized with a suitable combination of an initiator molecule $IX_n$ with a Lewis acid S. Details of this method of polymerization are disclosed, for example, in Kennedy and Ivan, Carbocationic Macromolecular Engineering, Hanser Publishers 1992.

Suitable initiator molecules $IX_n$ have one or more leaving groups X. The leaving group X is a Lewis base, which may also be further substituted. Examples of suitable leaving groups include the halogens fluorine, chlorine, bromine and iodine, straight-chain and branched alkoxy groups, such as $C_2H_5O$—, n-$C_3H_7O$—, i-$C_3H_7O$—, n-$C_4H_9O$—, i-$C_4H_9O$—, sec-$C_4H_9O$— or t-$C_4H_9O$—, and straight-chain and branched carboxyl groups, such as $CH_3$ CO—O—, $C_2H_5$CO—O—, n-$C_3H_7$CO—O—, i-$C_3H_7$CO—O—, n-$C_4H_9$CO—O—, i-$C_4H_9$CO—O—, sec-$C_4H_9$ CO—O— or t-$C_4H_9$CO—O—. Bonded to the leaving group or groups is the moiety I, which can form sufficiently stable carbocations $I^+$ under reaction conditions. For initiation of the polymerization, the leaving group is abstracted by means of a suitable Lewis acid S: I—X+S→$I^+XS^-$ (shown here only for the case n=1). The resulting carbocation $I^+$ initiates the cationic polymerization and is incorporated into the resulting polymer. Suitable Lewis acids S are, for example, $AlY_3$, $TiY_4$, $BY_3$, $SnY_4$ and $ZnY_2$, where Y is fluorine, chlorine, bromine or iodine. The polymerization reaction can be stopped by destroying the Lewis acid, for example by reaction thereof with alcohol. Polyisobutene which has terminal —C$(CH_3)_2$—Z groups, which can subsequently be converted into α- and β-olefin terminal groups, form thereby.

Preferred initiator molecules are structures which are capable of forming tertiary carbocations. Radicals which are derived from the lower oligomers of isobutene H—[$CH_2$—C$(CH_3)_2]_n$—X, where n is preferably from 2 to 5, are particularly preferred. Linear reactive polyisobutenes formed with such initiator molecules have a reactive group only at one end.

Linear polyisobutenes which have reactive groups at both ends can be obtained by using initiator molecules IXQ which have two leaving groups X and Q, where X and Q may be identical or different. In industry, compounds which comprise —C$(CH_3)_2$—X groups have proven useful. Examples include straight-chain or branched alkylene radicals $C_nH_{2n}$ (where n may preferably be from 4 to 30), which may also be interrupted by a double bond or an aromatic, such as X—$(CH_3)_2$C—$CH_2$—C$(CH_3)_2$-Q, X—$(CH_3)_2$C—$CH_2$—C$(CH_3)_2CH_2$—C$(CH_3)_2$-Q, X—$(CH_3)_2$C—$CH_2$—C$(CH_3)_2CH_2$—C$(CH_3)_2CH_2$—C$(CH_3)_2$-Q or X—$(CH_3)_2$C—$CH_2$—C$(CH_3)_2CH_2$—C$(CH_3)_2CH_2$—C$(CH_3)_2$—$CH_2$—C$(CH_3)_2$-Q, X—$(CH_3)_2$C—CH=CH—C$(CH_3)_2$-Q or para and/or meta

X—$(CH_3)_2$C—$C_6H_4$—C$(CH_3)_2$-Q,

Branched polyisobutenes can be obtained by using initiator molecules $IX_n$ which have 3 or more leaving groups, it being possible for the leaving groups to be identical or different. Examples of suitable initiator molecules comprise X—$(CH_3)_2$ C—$C_6H_3$—[C$(CH_3)_2$-Q]-C$(CH_3)_2$—P as the 1,2,4- and/or 1,3,5-isomer, where the leaving groups are preferably identical, but may also be different. Further examples of mono-, di- or tri- or polyfunctional initiator molecules are to be found in the paper by Kennedy and Ivan, cited at the outset, and in the literature cited there.

Suitable polyisobutenes are, for example, the Glissopal® grades from BASF Aktiengesellschaft, for example Glissopal 550, 1000, 1300 or 2300, and the Oppanol® grades from BASF AG, such as Oppanol B10 or B12.

Particularly suitable stabilizers for the novel aqueous polymer dispersion are those which have a polyisobutene block having a number average molecular weight $M_n$ of from 200 to 50 000, preferably from 200 to 20 000, particularly preferably from 450 to 5000, Dalton.

Depending on the polymerization process, the polydispersity index (PDI), i.e. the ratio of weight average to number average molecular weight, of the polyisobutenes which can preferably be used is from 1.05 to 10, preferably from 1.05 to 5, particularly preferably from 1.05 to 2.0.

The method for determining the polydispersity (PDI) and for the number average and weight average molecular weight is described, for example, in Analytiker-Taschenbuch, Volume 4, pages 433 to 442, Berlin 1984.

The hydrophobic (A) and hydrophilic units (B) forming the amphiphilic polymer are preferably linked by functionalizing the polyisobutene block, which forms the basis for the hydrophobic unit(s), with introduction of polar groups and then further modifying the functionalized polyisobutene block.

The present invention is in principle not limited with regard to the one or more hydrophilic units (B) which can be used for forming the stabilizer.

Units which are particularly readily soluble in water and particularly poorly soluble in oil are particularly advantageous.

One or more hydrophilic units (B) are preferably formed from repeating alkylene oxide units, preferably ethylene oxide or ethylene oxide/propylene oxide units, preferably with a proportion of from 0 to 50%, particularly preferably from 0 to 20%, of propylene oxide units. This may be a random copolymer, a gradient copolymer, or an alternating or a block copolymer of ethylene oxide and propylene oxide.

In addition to ethylene oxide and propylene oxide, the following pure alkylene oxides or mixtures may be used: 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide, styrene oxide or may be formed from a mixture of oxides of industrially available refined product streams.

The degree of functionalization of the modified polyisobutylene derivatives having terminal, polar groups is at least 65%, preferably at least 75%, very particularly preferably at least 85%. In the case of the polymers having polar groups only at one chain end, this information relates only to this one chain end. In the case of the polymers having polar groups at both chain ends and the branched products, this information relates to the total number of all chain ends. The unfunctionalized chain ends are both those which have no reactive group at all and those which have a reactive group but the latter was not reacted in the course of the functionalization reaction.

The term polar group is known to a person skilled in the art. The polar groups may be both protic and aprotic polar groups. The modified polyisobutenes thus have a hydrophobic moiety comprising a polyisobutene radical and a moiety which has at least a certain hydrophilic character and comprises terminal, polar groups. These are preferably strongly hydrophilic groups. The terms hydrophilic and hydrophobic are known to a person skilled in the art.

Polar groups comprise, for example, sulfo radicals, carboxylic anhydrides, carboxyl groups, carboxamides, carboxylic esters, phosphonic acid groups, phosphonic esters and phosphonamides, hydroxyl groups, arylhydroxyl groups, arylphosphoric esters, arylsulfuric esters, polyoxyalkylene groups, polyoxyalkylene esters of said acid groups, amino groups, polyethylenimino groups, amides of polyethylenimines of said acids or epoxides which may also be suitably substituted. Polyoxyalkylene groups, polyoxyalkylene esters, polyethylenimino groups, amides of polyethylenimines are preferred and polyoxyalkylene esters are particularly preferred.

Suitable reactions for introducing polar groups (functionalization) are known in principle to a person skilled in the art.

In principle, the functionalization of the polyisobutenes used according to the invention can be carried out in one or more stages.

In a preferred embodiment, the functionalization of the polyisobutene used according to the invention is effected in one or more stages and is selected from:
i) reaction with aromatic hydroxy compounds in the presence of an alkylation catalyst to give aromatic hydroxy compounds alkylated with polyisobutenes,
ii) reaction of the polyisobutene block with a peroxy compound to give an epoxidized polyisobutene,
iii) reaction of the polyisobutene block with an alkene which has a double bond substituted by electron-attracting groups (enophile), in an ene reaction,
iv) reaction of the polyisobutene block with carbon monoxide and hydrogen in the presence of a hydroformylation catalyst to give a hydroformylated polyisobutene,
v) reaction of the polyisobutene block with a phosphorus halide or a phosphorus oxychloride to give a polyisobutene functionalized with phosphono groups,
vi) reaction of the polyisobutene block with a borane and subsequent oxidative cleavage to give a hydroxylated polyisobutene,
vii) reaction of the polyisobutene block with an $SO_3$ source, preferably acetyl sulfate or oleum, to give a polyisobutene having terminal sulfo groups,
viii) reaction of the polyisobutene block with oxides of nitrogen and subsequent hydrogenation to give a polyisobutene having terminal amino groups.

The embodiment iii) is particularly preferred.

Re I): Alkylation of Aromatic Hydroxy Compounds

For the derivatization, the reactive polyisobutene can be reacted with an aromatic hydroxy compound in the presence of an alkylation catalyst. Suitable catalysts and reaction conditions of this Friedel-Crafts alkylation are described, for example, in J. March, Advanced Organic Chemistry, 4th Edition, John Wiley & Sons, pages 534-539, which is hereby incorporated by reference.

The aromatic hydroxy compound used for the alkylation is preferably selected from phenolic compounds having 1, 2 or 3 OH groups, which, if appropriate, may have at least one further substituent. Preferred further substituents are $C_1$-$C_8$-alkyl groups and in particular methyl and ethyl. Particularly preferred are compounds of the formula

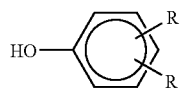

where R¹ and R², independently of one another, are hydrogen, OH or CH₃. Phenol, the cresol isomers, catechol, resorcinol, pyrogallol, fluoroglucinol and the xylenol isomers are particularly preferred. In particular, phenol, o-cresol and p-cresol are used. If desired, mixtures of the abovementioned compounds may also be used for the alkylation.

The catalyst is preferably selected from Lewis acid alkylation catalysts, which, in the context of the present application, are understood as meaning both individual acceptor atoms and acceptor-ligand complexes, molecules, etc., provided that these as a whole have (externally) Lewis acid (electron acceptor) properties. These include, for example, $AlCl_3$, $AlBr_3$, $BF_3$, $BF_3 \cdot 2C_6H_5OH$, $BF_3[O(C_2H_5)_2]_2$, $TiCl_4$, $SnCl_4$, $AlC_2H_5Cl_2$, $FeCl_3$, $SbCl_5$ and $SbF_5$. These alkylation catalysts can be used together with a cocatalyst, for example an ether. Suitable ethers are di-($C_1$-$C_8$)alkyl ethers, such as dimethyl ether, diethyl ether and di-n-propyl ether, and tetrahydrofuran, di-($C_5$-$C_8$-)cycloalkyl ethers, such as dicyclohexyl ether, and ethers having at least one aromatic hydrocarbon radical, such as anisole. If a catalyst-cocatalyst complex is used for the Friedel-Crafts alkylation, the ratio of the molar amounts of catalyst to cocatalyst is preferably from 1:10 to 10:1. The reaction can also be catalyzed by protic acids, such as sulfuric acid, phosphoric acid or trifluoromethanesulfonic acid. Organic protic acids may also be present in a form bound as a polymer, for example as an ion exchange resin.

The alkylation can be carried out in the absence of a solvent or in a solvent. Suitable solvents are, for example, n-alkanes and mixtures thereof and alkylaromatics, such as toluene, ethylbenzene and xylene and halogenated derivatives thereof.

The alkylation is preferably carried out at from −10 to +100° C. The reaction is usually carried out at atmospheric pressure but can also be carried out at higher or lower pressures.

By a suitable choice of the ratios of the molar amounts of aromatic hydroxy compound to polyisobutene and of the catalyst, the desired proportion of alkylated products and the degree of alkylation thereof can be established. For example, substantially monoalkylated polyisobutenylphenols are generally obtained with an excess of phenol or in the presence of a Lewis acid alkylation catalyst if an ether is additionally used as a cocatalyst.

The reaction of polyisobutenes with phenols in the presence of suitable alkylation catalysts is disclosed, for example, in U.S. Pat. No. 5,300,701 and WO 02/26840.

For the further functionalization, a polyisobutenylphenol obtained in step i) can be subjected to a Mannich reaction with at least one aldehyde, for example formaldehyde, and at least one amine which has at least one primary or secondary amine function, a compound alkylated with polyisobutene and additionally at least partly amino-alkylated being obtained. It is also possible to use reaction products and/or condensates of aldehyde and/or amine. The preparation of such compounds is described in WO 01/25 293 and WO 01/25 294, which are hereby incorporated by reference in their entirety.

For the preparation of the block copolymers described, a polyisobutenylphenol obtained in step i) is alkoxylated with alkylene oxides, preferably ethylene oxide, in a further step. In addition to ethylene oxide, the following pure alkylene oxides or mixtures may be used: propene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide and styrene oxide, or may be formed from a mixture of oxides of industrially available refined product streams.

In a further embodiment, the polyisobutenylphenols obtained are reacted with phosphorus oxychloride to give the aromatic phosphorus half-ester. This is reacted in a subsequent step with polyethylenimines, alkylene oxides or polyalkylene oxides to give the block copolymers described. Polyalkylene oxides are preferably used, for example polyethylene oxide, polypropylene oxide, mixed copolymers of EO and PO, monoalkylpolyethylene oxide (alkyl=methyl, ethyl, $C_{12}$—, $C_{18}$—, etc.), monoaminoethylene oxide, diaminoethylene oxide (cf. JP-A-09272796, PEO-diamine), etc. The reactions of the phosphorus half-ester groups with these polyalkylene oxides are polymer-analogous reactions (esterifications).

ii) Epoxidation

For functionalization, the reactive polyisobutene can be reacted with at least one peroxy compound to give an epoxidized polyisobutene. Suitable epoxidation methods are described in J. March, Advanced Organic Chemistry, 4th Edition, John Wiley & Sons, pages 826-829, which is hereby incorporated by reference. At least one per acid, such as m-chloroperbenzoic acid, performic acid, peracetic acid, trifluoroperacetic acid, perbenzoic acid or 3,5-dinitroperbenzoic acid, is preferably used as the peroxy compound. The preparation of the per acids can be effected in situ from the corresponding acids and $H_2O_2$, if appropriate in the presence of mineral acids. Further suitable epoxidizing reagents are, for example, alkaline hydrogen peroxide, molecular oxygen and alkyl peroxides, such as tert-butyl hydroperoxide. Suitable solvents for the epoxidation are, for example, conventional, nonpolar solvents. Particularly suitable solvents are hydrocarbons, such as toluene, xylene, hexane or heptane.

For the further functionalization, the epoxidized polyisobutenes which are obtained in step ii) can be reacted with ammonia, polyisobuteneaminoalcohols being obtained (EP-A 0 476 785).

For the preparation of the block copolymers described, the epoxidized polyisobutenes obtained are reacted with said alkylene oxides in a further step. Ethylene oxide is preferred here.

iii) Ene Reaction

For the functionalization, the reactive polyisobutene can furthermore be subjected to an ene reaction with at least one alkene which has an electron-poor double bond (cf. for example DE-A 195 19 042, DE-A 4 319 671, DE-A 4 319 672 or H. Mach and P. Rath in Lubrication Science II (1999), pages 175-185, which is hereby incorporated by reference in its entirety). In the ene reaction, an alkene referred to as ene and having a hydrogen atom in the allyl position is reacted with an electron-poor alkene, the enophile, in a pericyclic reaction, comprising formation of a carbon-carbon bond, a double bond shift and a hydrogen transfer. Here, the reactive polyisobutene reacts as the ene. Suitable enophiles are compounds such as those also used as dienophiles in the Diels-Alder reaction. Suitable enophiles are fumaroyl dichloride, fumaric acid, maleoyl dichloride, maleic anhydride and maleic acid, preferably maleic anhydride and maleic acid. The succinic acid derivatives of the formula Ia, Ib or Ic, where R is a polyisobutene group having a number average molecular weight $M_n$ of from 200 to 50 000, preferably from 200 to 20 000, particularly preferably from 450 to 5000, form.

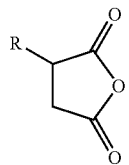

Ia

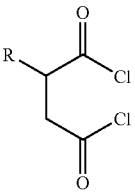

Ib

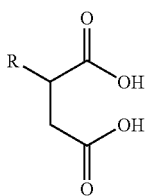

Ic

A very particularly preferably used enophile is maleic anhydride (formula Ic). Polyisobutenes functionalized with succinic anhydride groups (polyisobutenylsuccinic anhydride, PIBSA), as disclosed in EP-A 0 156 310, result.

The ene reaction can be carried out in the presence or absence of a Lewis acid as a catalyst. For example, aluminum chloride and ethylaluminum chloride are suitable.

In the reaction, a new α-olefin group is produced at the chain end. For the further functionalization and preparation of the block copolymers described, the polyisobutene derivatized with succinic anhydride groups is subjected to a subsequent reaction, which is selected from:

a) Reaction with at least one abovementioned alkylene oxide to give a polyisobutene functionalized with two succinic ester groups (per succinic anhydride group),
b) hydrolysis to give a polyisobutene functionalized with succinic acid groups, the succinic acid groups being reacted as under a) with alkylene oxides,
c) reaction with maleic anhydride to give a product having two succinic anhydride groups at the chain end (PIBSA), reaction being effected as under a) with alkylene oxides,
d) reaction with at least one amine to give a polyisobutene which is at least partly functionalized with succinimide groups and/or succinamide groups and is subjected to a further reaction with said alkylene oxides,
e) reaction with at least one alcohol or thioalcohol to give a polyisobutene which is functionalized with succinic ester groups or succinic thioester groups and is subjected to a further reaction with said alkylene oxides,
f) reaction with at least one polyethylenimine to give a polyisobutene which is at least partly functionalized with succinimide groups and/or succinamide groups,
g) reaction with at least one polyalkylene oxide which has at least one hydroxyl group to give a polyisobutene which is at least partly functionalized with succinic ester groups,
h) reaction with at least one polyalkylene oxide which has at least one amino group to give a polyisobutene which is at least partly functionalized with succinimide groups and/or succinamide groups,
i) reaction with at least one polyalkylene oxide which has at least one thiol group to give a polyisobutene which is at least partly functionalized with succinic thioester groups,
j) if, after the reaction of the succinic anhydride group, free carboxyl groups are still present, these can also be converted into salts. Particularly preferred cations in salts are alkali metal cations, ammonium ions and alkylammonium ions.

Re c)

The polyisobutenes derivatized with one succinic anhydride group per chain end can be subjected to an exhaustive ene reaction with an excess of maleic anhydride to give polyisobutenes partly functionalized with two succinic anhydride groups per chain end. The polyisobutenes functionalized in this manner can be reacted with said alkylene oxides, in each case two succinic ester groups forming per anhydride group.

Re d) and e)

For the further derivatization, the succinic anhydride group can be reacted, for example, with polar reactants, such as alcohols, thioalcohols or amines. Suitable polar reactants are preferably alcohols ROH, thioalcohols RSH or primary amines $RNH_2$ or secondary amines RR'NH, where R is a linear or branched saturated hydrocarbon radical which carries at least two substituents selected from the group consisting of OH, SH, $NH_2$ or $NH_3^+$ and, if appropriate, one or more CH(O) groups and, if appropriate, has nonneighboring —O— and/or —NH— and/or tertiary —N— groups, and R', independently of R, has the same meanings. Here, both carboxyl groups of the succinic anhydride may react or only one carboxyl group may react while the other carboxyl group is present as a free acid group or as a salt. In a further reaction, the free substituents (substituents which have not reacted with anhydride) are modified by alkoxylation, the block copolymers described being obtained.

Re f)

For the preparation of the block copolymers described, the succinic anhydride groups can be reacted with polyethylenimines with one or more polyisobutene chains being bonded per polyethylenimine chain, depending on the reaction procedure. The bonding takes place via succinimide groups and/or succinamide groups.

Re g), h) and i)

For the preparation of the block copolymers described, the succinic anhydride groups are reacted with polyalkylene oxides. Polyalkylene oxides may be used, for example polyethylene oxide, polypropylene oxide, mixed copolymers of EO and PO, monoalkylpolyethylene oxide (alkyl=$C_1$-$C_{24}$), monoesterpolyethylene oxide (ester=R—C(=O)—, where R=$C_1$-$C_{24}$), monoaminoethylene oxide, monothioethylene oxide, diaminoethylene oxide (cf. JP-A-09272796, PEO-diamine), etc. The reactions of the acid groups with these alkylene oxides are polymer-analogous reactions.

Further synthesis variants for the derivatization of succinic anhydride groups are mentioned in DE-A-101 25 158. The conversion of a succinic anhydride group under suitable conditions into a succinimide group is also known to a person skilled in the art.

In a further embodiment, reactive polyisobutene can be subjected to free radical copolymerization with maleic anhydride (cf. WO 95/07944, WO 01/55059, WO 90/03359). The strictly alternating copolymers thus obtained can be further reacted as described above. The reactions with alkylene oxides, polyalkylene oxides or polyethylenimines are preferred.

iv) Hydroformylation

For the functionalization, the reactive polyisobutene can be subjected to a reaction with carbon monoxide and hydrogen in the presence of a hydroformylation catalyst, the hydroformylated polyisobutene being obtained.

Suitable catalysts for the hydroformylation are known and preferably comprise a compound or a complex of an element of subgroup VIII of the Periodic Table of the Elements, such as Co, Rh, Ir, Ru, Pd or Pt. For influencing the activity and/or selectivity, hydroformylation catalysts modified with N- or P-containing ligands are preferably used. Suitable salts of these metals are, for example, the hydrides, halides, nitrates, sulfates, oxides or sulfides or the salts with alkane- or arylcarboxylic acids or alkane- or arylsulfonic acids. Suitable complex compounds have ligands which are selected, for example, from halides, amines, carboxylates, acetylacetonate, aryl- or alkanesulfonates, hydride, CO, olefins, dienes, cycloolefins, nitriles, N-containing heterocycles, aromatics and heteroaromatics, ethers, $PF_3$, phospholes, phosphabenzenes and mono-, bi- and polydentate phosphine, phosphinite, phosphonite, phosphoramidite and phosphite ligands.

In general, catalytically active species of the formula $H_xM_y(CO)_zL_q$, where M is a metal of subgroup VIII, L is a ligand and q, x, y and z are integers dependent on the valency and type of metal and on the covalence of the ligand L, are formed under hydroformylation conditions from the catalysts or catalyst precursors used in each case.

According to a preferred embodiment, the hydroformylation catalysts are prepared in situ in the reactor used for the hydroformylation reaction.

Another preferred form is the use of a carbonyl generator in which prepared carbonyl, for example, is adsorbed onto active carbon and only the desorbed carbonyl is fed to the hydroformylation but not the salt solutions from which the carbonyl is produced. Rhodium compounds or rhodium complexes suitable as catalysts are, for example, rhodium(II) and rhodium(III) salts, such as rhodium(III) chloride, rhodium(III) nitrate, rhodium(III) sulfate, potassium rhodium sulfate, rhodium(II) or rhodium(III) carboxylate, rhodium(II) and rhodium(III) acetate, rhodium(II) oxide, salts of rhodium(III) acid, trisammoniumhexachlororhodate(III), etc. Rhodium complexes, such as rhodiumbiscarbonylacetylacetonate, acetylacetonatobisethylenerhodium(I), etc., are furthermore suitable.

Also suitable are ruthenium salts or ruthenium compounds. Suitable ruthenium salts are, for example, ruthenium(III) chloride, ruthenium(IV), ruthenium(VI) or ruthenium(VII) oxide, alkali metal salts of the ruthenium oxoacids, such as $K_2RuO_4$ or $KRuO_4$, or complex compounds, e.g. $RuHCl(CO)(PPh_3)_3$. The metal carbonyls of ruthenium, such as trisrutheniumdodecacarbonyl or hexarutheniumoctadecacarbonyl, or mixed forms in which CO is partly replaced by ligands of the formula $PR_3$, such as $Ru(CO)_3(PPh_3)_2$, can also be used.

Suitable cobalt compounds are, for example, cobalt(II) chloride, cobalt(II) sulfate, cobalt(II) carbonate, cobalt(II) nitrate, the amine or hydrate complexes thereof, cobalt carboxylates, such as cobalt formate, cobalt acetate, cobalt ethylhexanoate, cobalt naphthanoate, and the cobalt-caprolactamate complex. Here too, the carbonyl complexes of cobalt, such as dicobaltoctacarbonyl, tetracobaltdodecacarbonyl and hexacobalthexadecacarbonyl, may be used.

Said and further suitable compounds are known in principle and are sufficiently described in the literature.

Suitable activating agents which can be used for the hydroformylation are, for example, Brønsted acids, Lewis acids, such as $BF_3$, $AlCl_3$ and $ZnCl_2$, and Lewis bases.

The composition of the synthesis gas used, comprising carbon monoxide and hydrogen, may vary within wide ranges. The molar ratio of carbon monoxide to hydrogen is as a rule from about 5:95 to 95:5, preferably from about 40:60 to 60:40. The temperature during the hydroformylation is in general from about 20 to 200° C., preferably from about 50 to 190° C. The reaction is carried out as a rule at the partial pressure of the reaction gas at the chosen reaction temperature. In general, the pressure is from about 1 to 700, preferably from 1 to 300, bar.

The carbonyl number of the hydroformylated polyisobutenes obtained depends on the number average molecular weight $M_n$. Products having a number average molecular weight $M_n$ of 10 000 Dalton preferably have carbonyl numbers of from 2 to 5.6, in particular from 3.6 to 5.6, mg KOH/g. Products having a number average molecular weight $M_n$ of 40 000 Dalton have carbonyl numbers of from 0.5 to 1.4, in particular from 0.9 to 1.4, mg KOH/g. The carbonyl numbers of products having other molecular weights can be determined by interpolation or extrapolation.

Preferably, the predominant part of the double bonds contained in the medium molecular weight, reactive polyisobutene used is converted into aldehydes by the hydroformylation. By using suitable hydroformylation catalysts and/or an excess of hydrogen in the synthesis gas employed, the predominant part of the ethylenically unsaturated double bonds present in the starting material can also be directly converted into alcohols (cf. for example DE-A 100 03 105). This can also be effected in a two-stage functionalization according to reaction step B) described below.

The functionalized polyisobutenes obtained by hydroformylation are advantageously suitable as intermediates for further processing by functionalization of at least a part of the aldehyde function present in them.

A) Oxocarboxylic Acids

For the further functionalization, the hydroformylated polyisobutenes obtained in step iv) can be reacted with an oxidizing agent to give a polyisobutene which is at least partly functionalized with carboxyl groups.

For the oxidation of aldehydes to carboxylic acids, it is in general possible to use a large number of different oxidizing agents and oxidation processes, which are described, for example, in J. March, Advanced Organic Chemistry, John Wiley & Sons, 4th Edition, page 701 et seq. (1992). These include, for example, the oxidation with permanganate, chromate, atmospheric oxygen, etc. The oxidation with air/oxygen can be effected both catalytically in the presence of metal salts and in the absence of catalysts. Preferably used metals are those which are capable of a change of valency, such as Cu, Fe, Co, Mn, etc. The reaction also takes place as a rule in the absence of a catalyst. In the atmospheric oxidation, the conversion can readily be controlled by means of the duration of reaction.

According to a further embodiment, an aqueous hydrogen peroxide solution in combination with a carboxylic acid, e.g. acetic acid, is used as the oxidizing agent. The acid number of the resulting polyisobutenes having a carboxyl function depends on the number average molecular weight $M_n$. Products having a number average molecular weight $M_n$ of 10 000 Dalton preferably have acid numbers of from 2 to 5.6, in particular from 3.6 to 5.6, mg KOH/g. Products having a number average molecular weight $M_n$ of 40 000 Dalton have acid numbers of from 0.5 to 1.4, in particular from 0.9 to 1.4, mg KOH/g. The acid numbers for products having other molecular weights can be determined by interpolation or extrapolation.

For the preparation of the block copolymers described, the resulting polyisobutenes having a carboxyl function are reacted in a further step. Reactions may be those with alkylene oxides, esterifications with polyalkylene oxides or amide formation with polyethylenimines.

B) Oxo Alcohols

In a further suitable embodiment, the hydroformylated polyisobutenes obtained in step iv) can be subjected to a reaction with hydrogen in the presence of a hydrogenation catalyst to give a polyisobutene which is at least partly functionalized with alcohol groups.

Suitable hydrogenation catalysts are in general transition metals, such as Cr, Mo, W, Fe, Rh, Co, Ni, Pd, Pt, Ru, etc., or mixtures thereof, which can be applied to supports, such as active carbon, alumina, kieselguhr, etc., in order to increase the activity and stability. In order to increase the catalytic activity, Fe, Co and preferably Ni may also be used in the form of the Raney catalysts as metal sponge having a very large surface area.

The hydrogenation of the oxo aldehydes from stage iv) is effected preferably at elevated temperatures and superatmospheric pressure, depending on the activity of the catalyst. The reaction temperature is preferably from about 80 to 150° C. and the pressure from about 50 to 350 bar.

The alcohol number of the resulting polyisobutenes having hydroxyl groups depends on the number average molecular weight $M_n$. Products having a number average molecular weight $M_n$ of 10 000 Dalton preferably have alcohol numbers of from 2 to 5.6, in particular from 3.6 to 5.6, mg KOH/g. Products having a number average molecular weight $M_n$ of 40 000 Dalton have alcohol numbers of from 0.5 to 1.4, in particular from 0.9 to 1.4, mg KOH/g. The alcohol numbers of products having other molecular weights can be determined by interpolation or extrapolation.

For the preparation of the block copolymers described, the polyisobutenes functionalized with alcohol groups are alkoxylated with alkylene oxides, preferably ethylene oxide, in a further step.

C) Amine Synthesis

According to a further suitable embodiment, the hydroformylated polyisobutenes obtained in step iv) are subjected, for further functionalization, to a reaction with hydrogen and ammonia or a primary or secondary amine in the presence of an amination catalyst to give a polyisobutene which is at least partly functionalized with amino groups.

Suitable amination catalysts are the hydrogenation catalysts described above in stage b), preferably copper, cobalt or nickel, which can be used in the form of the Raney metals or on a support. Platinum catalysts are also suitable.

In the amination with ammonia, aminated polyisobutenes having primary amino functions are obtained. Primary and secondary amines suitable for the amination are compounds of the formulae R—$NH_2$ and RR'NH, where R and R', independently of one another, are, for example, $C_1$-$C_{10}$-alkyl, $C_6$-$C_{20}$-aryl, $C_7$-$C_{20}$-arylalkyl, $C_7$-$C_{20}$-alkylaryl or cycloalkyl.

The amine number of the resulting polyisobutenes having an amino function depends on the number average molecular weight $M_n$. Products having a number average molecular weight $M_n$ of 10 000 Dalton preferably have amine numbers of from 2 to 5.6, in particular from 3.6 to 5.6, mg KOH/g. Products having a number average molecular weight $M_n$ of 40 000 Dalton have amine numbers of from 0.5 to 1.4, in particular from 0.9 to 1.4, mg KOH/g. The amine numbers for products having other molecular weights can be determined by interpolation or extrapolation.

For the preparation of the block copolymers described, the polyisobutenes functionalized with amino groups are alkoxylated with alkylene oxides, preferably ethylene oxide, in a further step.

v) Preparation of Phosphonic Acid Derivatives

For the functionalization, the reactive polyisobutene can be subjected to a reaction with $PX_5$ (X=Cl, Br, I) to give a polyisobutene functionalized with a phosphonyl halide group. For the further functionalization, the derivatized polyisobutene is subjected to a subsequent reaction which is selected from:

a) reaction with at least one stated alkylene oxide to give a polyisobutene functionalized with phosphonic ester groups,
b) hydrolysis to give a polyisobutene functionalized with phosphonic acid groups, the phosphonic acid groups being reacted with alkylene oxides as under a),
c) reaction with at least one amine to give a polyisobutene which is at least partly functionalized with phosphonamide groups and is subjected to a further reaction with said alkylene oxides,
d) reaction with at least one alcohol to give a polyisobutene which is functionalized with phosphonic ester groups and is subjected to a further reaction with said alkylene oxides,
e) reaction with at least one polyethylenimine to give a polyisobutene which is at least partly functionalized with succinimide groups and/or succinamide groups,
f) reaction with at least one polyalkylene oxide which has at least one hydroxyl group to give a polyisobutene which is at least partly functionalized with phosphonic ester groups,
g) reaction with at least one polyalkylene oxide which has at least one amino group to give a polyisobutene which is at least partly functionalized with phosphonamide groups,
h) reaction with at least one polyalkylene oxide which has at least one thio group to give a polyisobutene which is at least partly functionalized with phosphonic thioester groups,
i) if, after the reaction of the phosphonyl halide group, free acid groups are still present, these can also be converted into salts. Particularly suitable cations in salts are alkali metal cations, ammonium ions and alkylammonium ions.

Re c) and d)

For the further derivatization, the phosphonyl halide groups can, for example, be reacted with polar reactants, such as alcohols or amines. Suitable polar reactants are preferably alcohols ROH or primary amines $RNH_2$ or secondary amines RR'NH, where R is a linear or branched saturated hydrocarbon radical which carries at least two substituents selected from the group consisting of OH, SH, $NH_2$ and $NH_3^+$ and, if appropriate, one or more CH(O) groups and, if appropriate, has nonneighboring —O— and/or —NH— and/or tertiary —N— groups, and R', independently of R, has the same meanings. Here, both phosphonic acid groups are capable of reacting or only one phosphonic acid group is capable of reacting while the other phosphonic acid group is present as a free acid group or as a salt. In a further reaction, the free substituents (substituents not reacted with a phosphonyl halide group) are modified with alkoxylation, the block copolymers described being obtained.

Re e)

For the preparation of the block copolymers described, the succinic anhydride groups can be reacted with polyethylenimines, one or more polyisobutene chains being bonded per polyethylenimine chain, depending on the reaction procedure. The bonding takes place via succinimide groups and/or succinamide groups.

Re g), h) and i)

For the preparation of the block copolymers described, the phosphonyl halide groups are reacted with polyalkylene oxides. Polyalkylene oxides may be used, for example polyethylene oxide, polypropylene oxide, mixed copolymers of EO and PO, monoalkylpolyethylene oxide (alkyl=methyl, ethyl, $C_{12}$—, $C_{18}$—, etc.). Monoaminoethylene oxide, monothioethylene oxide, diaminoethylene oxide (cf. JP-A-09272796, PEO-diamine), etc. The reactions of the acid groups with these alkylene oxides are polymer-analogous reactions.

vi) Hydroboration

For the functionalization, the reactive polyisobutene can be subjected to a reaction with a borane (if appropriate produced in situ), a hydroxylated polyisobutene being obtained.

Suitable hydroboration processes are described in J. March, Advanced Organic Chemistry, 4th Edition, John Wiley & Sons, pages 783-789, which is hereby incorporated by reference. Suitable hydroboration reagents are, for example, diborane, which as a rule is produced in situ by reacting sodium borohydride with $BF_3$ etherate, disiamylborane (bis-[3-methylbut-2-yl]borane), 1,1,2-trimethylpropylborane, 9-borobicyclo[3.3.1]nonane, diisocamphenylborane, which are obtainable by hydroboration of the corresponding alkenes with diborane, chloroborane dimethyl sulfide, alkyldichloroboranes or $H_3B$—$N(C_2H_5)_2$.

Usually, the hydroboration is carried out in a solvent. Suitable solvents for the hydroboration are, for example, acyclic ethers, such as diethyl ether, methyl tert-butyl ether, dimethoxyethane, diethylene glycol dimethyl ether, triethylene glycol dimethyl ether, cyclic ethers, such as tetrahydrofuran or dioxane, and hydrocarbons, such as hexane or toluene, or mixtures thereof. The reaction temperature is as a rule determined by the reactivity of the hydroboration agent and is usually from the melting point to the boiling point of the reaction mixture, preferably from 0 to 60° C.

Usually, the hydroboration agent is used in excess, based on the alkene. The boron atom preferably undergoes addition at the less substituted and hence sterically less hindered carbon atom.

Usually, the alkylboranes formed are not isolated but are converted directly into the desired products by subsequent reaction. A very important reaction of the alkylboranes is the reaction with alkaline hydrogen peroxide to give an alcohol, which preferably formally corresponds to the anti-Markovnikov hydroxylation of the alkene.

For the preparation of the block copolymers described, the polyisobutenes functionalized with alcohol groups are alkoxylated with alkylene oxides, preferably ethylene oxide, in a further step.

vii) Reaction with an $SO_3$ Source

For the functionalization, the reactive polyisobutene can furthermore be reacted with an $SO_3$ source, a polyisobutene having terminal sulfo groups being formed.

The polyisobutenes functionalized with sulfo groups can be prepared by reacting the reactive polyisobutenes with an $SO_3$ source. Suitable $SO_3$ sources constitute a mixture of sulfur trioxide and air, sulfur trioxide hydrates, sulfur trioxide-amine complexes, sulfur trioxide-ether complexes, sulfur trioxide-phosphate complexes, oleum, acetyl sulfate, a mixture of sulfur trioxide and acetic anhydride, sulfamic acid, alkyl sulfates or chlorosulfonic acids. The reaction can be carried out either in the absence of a solvent or in any desired inert anhydrous solvent. Suitable reaction temperatures are from –30° C. to +200° C. and are dependent on the sulfonation reagent used. For example, a sulfonation with acetyl sulfate is effected at low temperatures, and elevated temperatures should be avoided, since otherwise decomposition of the product may occur. The sulfonation reagent is generally used in a molar ratio of from 1:1 to 2:1 relative to polyisobutene. Acetyl sulfate or a mixture of sulfuric acid and acetic anhydride is preferably used, acetyl sulfate being formed in situ, and the polyisobutene functionalized with sulfo groups is formed directly. Other sulfonation reagents from among said sulfonation reagents, for example a mixture of sulfur trioxide and oxygen, may first form an intermediate sultone, which has to be hydrolyzed to the desired sulfonic acid. A process for the preparation of polyisobutenes functionalized with sulfo groups is disclosed, for example, in WO 01/70830.

As described under v) for the phosphonyl halide groups, the polyisobutenes functionalized with sulfo groups can also be reacted with alkylene oxides, polyalkylene oxides or polyethylenimines to give the block copolymers.

If, after the functionalization, free acid groups are still present, these can also be converted into the salt form. Particularly suitable cations in salts are alkali metal cations, ammonium ions and alkylammonium ions.

viii) Functionalization with Amino Groups

For the functionalization, the reactive polyisobutene can be reacted with oxides of nitrogen, polyisobutenes having terminal amino groups being obtained after subsequent hydrogenation.

Suitable oxides of nitrogen are, for example, NO, $NO_2$, $N_2O_3$, $N_2O_4$, mixtures of these oxides of nitrogen with one another and mixtures of these oxides of nitrogen with oxygen. Mixtures of NO or $NO_2$ with oxygen are particularly preferred. Furthermore, the oxides of nitrogen may additionally comprise inert gases, e.g. nitrogen. The reaction of the polyisobutenes with the oxides of nitrogen is generally effected at from –30 to +150° C. in an inert organic solvent. The products obtained are then hydrogenated, preferably by catalytic hydrogenation with hydrogen in the presence of hydrogenation catalysts. The hydrogenation is generally carried out in a temperature range from 20 to 250° C., depending on the reducing system used. The hydrogenation pressure in the catalytic hydrogenation is generally from 1 to 300 bar. A process for the preparation of polymers terminated with amino groups is disclosed, for example, in WO 97/03946.

For the preparation of the block copolymers described, the polyisobutenes functionalized with amino groups are alkoxylated with alkylene oxides, preferably ethylene oxide, in a further step.

The block copolymers consist of at least one hydrophobic unit A, formed from reactive polyisobutenes having at least one polar functional group as an anchor group, and at least one hydrophilic unit B, formed from a polyalkylene oxide. For introducing the hydrophilic unit B, the functionalized polyisobutenes are either reacted with alkylene oxides or subjected to a polymer-analogous reaction with polyalkylene oxides, depending on the type of their polar group(s), as described above.

The block copolymers described are preferably prepared from a hydrophobic unit A, formed from reactive polyisobutenes having at least one functional group, in a polymer-analogous reaction with a hydrophilic unit B, formed from a polyalkylene oxide.

The following functional groups on the reactive polyisobutene are preferred for a polymer-analogous reaction: acid, acid halide or acid anhydride groups (carboxyl, carboxylic anhydride, phosphonic acid, phosphonyl halide, phosphoric acid, phosphoryl halide or sulfuric acid groups); polyisobutenes functionalized with carboxylic anhydride groups are particularly preferred and polyisobutenes functionalized with succinic anhydride groups are very particularly preferred.

Both polyalkylene oxides based on ethylene oxide, propylene oxide and butylene oxide and those based on further alkylene oxides may be used as hydrophilic unit B. The following pure alkylene oxides or mixtures may serve as further alkylene oxides: 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 2,3-hexene oxide, 3,4-hexene oxide, 2-methyl-1,2-pentene oxide, 2-ethyl-1,2-butene oxide, 3-methyl-1,2-pentene oxide, decene oxide, 4-methyl-1,2-pentene oxide, styrene oxide or mixtures of oxides which are formed from industrially available refined product streams. It is also possible to use polyglycerol and polytetrahydrofuran.

Depending on the type of monomer building blocks, the polyalkylene oxides comprise the following structural units:

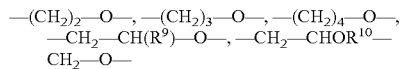

where $R^9$ is $C_1$-$C_{24}$-alkyl;

$R^{10}$ is hydrogen, $C_1$-$C_{24}$-alkyl, $R^9$—C(=O)—, $R^9$—NH—C(=O)—.

The structural units may be both homopolymers and random copolymers, gradient copolymers or alternating or block copolymers.

Preferably used hydrophilic units B are compounds of the following formula (II)

where, independently of one another, $R^1$ is hydrogen, $C_1$-$C_{24}$-alkyl, $R^6$—C(=O)—, $R^6$—NH—C(=O)— or a polyalcohol radical;

$R^5$ is hydrogen, $C_1$-$C_{24}$-alkyl, $R^6$—C(=O)— or $R^6$—NH—C(=O)—;

$R^2$ to $R^4$ are —(CH$_2$)$_2$—, —(CH$_2$)$_3$—, —(CH$_2$)$_4$—, —CH$_2$—CH(R$^6$)— or —CH$_2$—CHOR$^7$—CH$_2$—;

$R^6$ is $C_1$-$C_{24}$-alkyl;

$R^7$ is hydrogen, $C_1$-$C_{24}$-alkyl, $R^6$—C(=O)— or $R^6$—NH—C(=O)—;

A is —C(=O)—O, —C(=O)-D-C(=O)—), —CH$_2$—CH(—OH)-D-CH(—OH)—CH$_2$—O or —C(=O)—NH-D-NH—C(=O)—O;

D is —(CH$_2$)$_t$—, arylene, unsubstituted or substituted;

$R^{11}$ and $R^{12}$ are hydrogen, $C_1$-$C_{24}$-alkyl, $C_1$-$C_{24}$-hydroxyalkyl, benzyl or phenyl;

n is 1 if $R^1$ is not a polyalcohol radical or n is from 1 to 500 if $R^1$ is a polyalcohol radical;

s is from 0 to 1000; t is from 1 to 12; u is from 1 to 2000; v is from 0 to 2000; w is from 0 to 2000;

x is from 0 to 2000; y is from 0 to 2000; z is from 0 to 2000.

Examples of alkyl radicals $R^6$, $R^{11}$ and $R^{12}$ are branched or straight $C_1$-$C_{24}$-alkyl chains, preferably methyl, ethyl, n-propyl, 1-methylethyl, n-butyl, 1-methylpropyl-, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, 2-ethylhexyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl or n-eicosyl.

Examples of preferred members of the abovementioned alkyl radicals are branched or straight $C_1$-$C_{12}$-alkyl chains, particularly preferably $C_1$-$C_6$-alkyl chains.

Preferred polyalkylene oxides are those which are composed of repeating alkylene oxide units, such as ethylene oxide or ethylene oxide/propylene oxide units, preferably with a proportion of from 0 to 50, particularly preferably from 0 to 20, % of propylene oxide units. Said polyalkylene oxide may be a random copolymer, a gradient copolymer or an alternating or block copolymer of ethylene oxide and propylene oxide. A very particularly preferred polyalkylene oxide is polyethylene oxide.

The molecular weight of the polyalkylene oxides is in the region of 200 (based on number average), preferably from 200 to 50 000, particularly preferably from 500 to 30 000, very particularly preferably from 800 to 15 000.

In addition to polyalkylene oxides, such as polyethylene oxide, polypropylene oxide and mixed copolymers of EO and PO, it is also possible, for example, to use monoalkylpolyethylene oxide (alkyl=$C_1$-$C_{24}$), monoesterpolyethylene oxide (ester=R—C(=O)—, where R=$C_1$-$C_{24}$), monoaminoethylene oxide, monothioethylene oxide, diaminoethylene oxide (cf. JP-A-09272796, PEO-diamine), etc.

In addition to straight-chain homo- or copolymers, it is also possible to use branched ones as hydrophilic unit B. Branched polymers can be prepared by subjecting ethylene oxide and, if appropriate, also propylene oxide and/or butylene oxides to an addition reaction, for example with polyalcohol radicals, e.g. with pentaerythritol, or glycerol, or with sugar alcohols, such as D-sorbitol and D-mannitol, but also with polysaccharides, such as cellulose and starch. The alkylene oxide units may be distributed randomly or present in the form of blocks in the polymer.

However, it is also possible to use polyesters of polyalkylene oxides and aliphatic or aromatic dicarboxylic acids, e.g. oxalic acid, succinic acid, adipic acid and terephthalic acid, having molar masses of from 1500 to 25 000, as described, for example, in EP-A-0 743 962, as a polyether-containing compound. Furthermore, it is also possible to use polycarbonates, by reacting polyalkylene oxides with phosgene or carbonates, such as diphenyl carbonate, and polyurethanes, by reacting polyalkylene oxides with aliphatic and aromatic diisocyanates.

Furthermore, homo- and copolymers of polyalkylene oxide-containing ethylenically unsaturated monomers, for example polyalkylene oxide (meth)acrylates, polyalkylene oxide vinyl ethers, polyalkylene oxide (meth)acrylamides, polyalkylene oxide allylamides or polyalkylene oxide vinylamides, may be used as polyalkylene oxides. Of course, copolymers of such monomers with other ethylenically unsaturated monomers may also be used.

However, reaction products of polyethylenimines with alkylene oxides may also be used as hydrophilic unit B. In this case, preferably used alkylene oxides are ethylene oxide, propylene oxide, butylene oxide and mixtures of these, particularly preferably ethylene oxide. Polethylenimines which may be used are polymers having number average molecular weights of from 300 to 20 000, preferably from 500 to 10 000, very particularly preferably from 500 to 5000. The weight ratio of alkylene oxide to polyethylenimine used is from 100:1 to 0.1:1, preferably from 50:1 to 0.5:1, very particularly preferably from 20:1 to 0.5:1.

For the preparation of the polyalkylene oxides, alkoxylation catalysts are used. For example, alkali metal hydroxides or alkali metal alcoholates, but also Lewis acids, for example $BF_3$, $SbCl_5$, $SnCl_4.2H_2O$, $BF_3.H_3BO_4$ or $BF_3$ dietherates may be used as alkoxylation catalysts. Particularly suitable alkoxylation catalysts are double hydroxide clays, such as hydrotalcite, which may be modified in particular with additives, as described in DE-A 43 25 237.

Depending on the choice of the alkoxylation catalyst, specific properties of the alkoxylates result in each case, in particular with regard to the distribution of the degree of alkoxylation. Thus, with the use of the last-mentioned double hydroxide clays, alkoxylation products having a narrow molecular weight distribution or homolog distribution are obtained, which alkoxylation products are particularly suitable for use in the novel block copolymers.

The advantageous properties described above, in particular with regard to the degree of alkoxylation, are also achieved by using double metal cyanide (DMC) compounds, as described, for example, in DE-A 102 43 361 as alkoxylation catalysts.

Stabilizers based on amphiphilic block copolymers, consisting of at least one hydrophobic unit A, formed from reactive polyisobutenes having at least one polar functional group as an anchor group, and at least one hydrophilic unit B, formed from a polyalkylene oxide, are also suitable. For introducing the hydrophilic unit B, the functionalized polyisobutenes, depending on the type of their polar group(s), are either reacted with alkylene oxides or subjected to a polymer-analogous reaction with polyalkylene oxides, as described.

The block copolymers described are preferably prepared from a hydrophobic unit A, formed from reactive polyisobutenes having at least one functional group, in a polymer-analogous reaction with a hydrophilic unit B, formed from a polyalkylene oxide.

If the hydrophilic units (B) are prepared by reacting one or more functionalized polyisobutenes with alkylene oxides, the hydrophilic block of the block copolymer described is formed only during the reaction. In the described polymer-analogous reactions of one or more functionalized polyisobutenes with polyalkylene oxides, on the other hand, preformed hydrophilic blocks (B) are used. Regardless of the method of preparation, the compositions applicable for the hydrophilic units (B) are the same as those described.

According to the invention, three-block copolymers having an A-B-A structure are preferably used as stabilizers.

Further preferred structures of the stabilizers are either generally $A_p B_q$, where p and q, independently of one another, are from 1 to 8, in the form of linear or branched structures or comb structures, which are used, for example, with the use of polyalcohols, such as polyvinyl alcohol, sugar alcohols or starch as initiators for a reaction with alkylene oxides and thus form a comb-like hydrophilic polyetherol block (B). Examples of linear and branched structures of the block copolymers are AB, $AB_2$, $A_2B$, BAB, $AB_3$, $AB_5$, $B_4A$ and $B_5A$.

Two-block copolymers AB and three-block copolymers ABA are preferred, and three-block copolymers ABA composed of polyisobutene functionalized with succinic anhydride groups (PIBSA) as hydrophobic block A and of polyethylene oxide as hydrophilic block B are particularly preferred.

In the synthesis of three-block copolymers having the structure A-B-A, it is preferable to start from a succinic anhydride which comprises a covalently bonded polyisobutylene block, i.e. from polyisobutenylsuccinic anhydride (PIBSA). This is the block A, which is bonded to succinic anhydride via a covalent C—C bond. Succinic anhydride forms the function of a linker which links the blocks A and B to one another. PIBSA is subjected to a polymer-analogous reaction with polyethylene oxides to give the half-esters. The reaction of PIBSA with polyalkylene glycols thus consists of an esterification.

The polyisobutene block has, for example, an average molar mass $M_n$ of from 200 to 50 000, preferably from 200 to 20 000, particularly preferably from 450 to 5000.

ABA block copolymers are prepared by reacting, for example, two equivalents of PIBSA with one equivalent of a polyalkylene glycol. The reaction of PIBSA and a polyethylene glycol serves as an example:

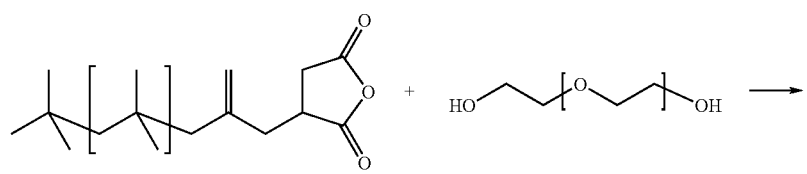

-continued

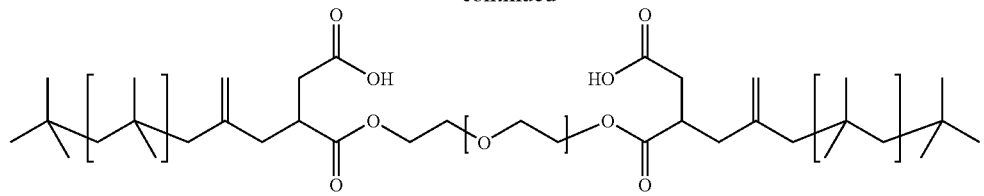

The molecular weight of the polyethylene oxides is in the region of 200 (based on number average), preferably from 200 to 50 000, particularly preferably from 500 to 30 000, very particularly preferably from 800 to 15 000.

Depending on the use, a certain ratio of hydrophobic PIB block to hydrophilic polyalkylene oxide block is chosen. A further possibility for controlling the desired effect consists in using two-block or three-block copolymers or other block structures. In individual cases, a mixture of the copolymers described here is advantageous. Mixing variants may be a variable hydrophobic block, variable hydrophilic block, variable structure (AB or ABA or $A_pB_q$, where p and q, independently of one another, are from 1 to 8, or comb structures). The block copolymers are present in the aqueous dispersions, for example, in amounts of from 0.1 to 70. Preferably, the aqueous dispersions comprise from 0.5 to 20% by weight of an amphiphilic polymer having a structure of the type AB or ABA or comprise a further type mentioned.

Two-block copolymers AB and three-block copolymers ABA are preferred, and three-block copolymers ABA composed of polyisobutene functionalized with succinic anhydride groups (PIBSA) as hydrophobic block A and of polyethylene oxide as hydrophilic block B are particularly preferred.

Examples of the stabilizers present according to the invention in the aqueous polymer dispersions are block copolymers composed of at least one hydrophobic block A consisting of polyisobutene and at least one hydrophilic block B consisting of polyalkylene oxide. The structure of the stabilizers can in general be described as $A_pB_q$ (where p and q, independently of one another, are from 1 to 8). It is also possible to use stabilizers having a comb structure, where A is a polyisobutene block having an average molar mass $M_n$ of from 200 to 50 000 and B is a polyalkylene oxide block having an average molar mass $M_n$ of from 200 to 50 000.

Aqueous polymer dispersions which comprise, as a stabilizer, three-block copolymers composed of polyisobutene functionalized with succinic anhydride groups (PIBSA) as hydrophobic block A and of polyethylene oxide (PEO) as hydrophilic block B, having the structure A-B-A, are preferred, where A is a polyisobutene block having an average molar mass $M_n$ of from 200 to 20 000 and B is a polyalkylene oxide block having an average molar mass $M_n$ of from 500 to 30 000.

Aqueous polymer dispersions which comprise three-block copolymers composed of polyisobutene functionalized with succinic anhydride groups (PIBSA) as hydrophobic block A and of polyethylene oxide (PEO) as hydrophilic block B, having the structure A-B-A, are preferred, where A is a polyisobutene block having an average molar mass $M_n$ of from 450 to 5000 and B is a polyalkylene oxide block having an average molar mass $M_n$ of from 800 to 15 000.

The novel aqueous polymer dispersions are prepared by polymerizing ethylenically unsaturated monomers in an aqueous medium in the presence of free radical polymerization initiators and stabilizers by an emulsion polymerization method, block copolymers composed of at least one hydrophobic block A consisting of polyisobutene and at least one hydrophilic block B consisting of polyalkylene oxide being used as the stabilizer. The structure of the stabilizers can generally be described as $A_pB_q$ (where p and q, independently of one another, are from 1 to 8). It is also possible to use stabilizers having a comb structure, where A is a polyisobutene block having an average molar mass $M_n$ of from 200 to 50 000 and B is a polyalkylene oxide block having an average molar mass $M_n$ of from 200 to 50 000.

The amphiphilic block copolymers are used as a stabilizer before, during or after the polymerization. Preferably, three-block copolymers composed of polyisobutene functionalized with succinic anhydride groups (PIBSA) as hydrophobic block A and of polyethylene oxide (PEO) as hydrophilic block B, having the structure A-B-A, where A is a polyisobutene block having an average molar mass $M_n$ of from 200 to 20 000 and B is a polyalkylene oxide block having an average molar mass $M_n$ of from 500 to 30 000, are used as the stabilizer in the preparation of the aqueous polymer dispersions.

In the particularly preferred embodiment of the novel process, three-block copolymers composed of polyisobutene functionalized with succinic anhydride groups (PIBSA) as hydrophobic block A and of polyethylene oxide (PEO) as hydrophilic block B, having the structure A-B-A, where A is a polyisobutene block having an average molar mass $M_n$ of from 450 to 5000 and B is a polyalkylene oxide block having an average molar mass $M_n$ of from 800 to 15 000, are used as the stabilizer before or during the polymerization.

The present invention also relates to the use of aqueous polymer dispersions as associative thickeners for aqueous media, in particular as associative thickeners for paper coating slips, in textile production, as thickeners for textile print pastes, in the pharmaceutical and cosmetics sector, for surface coatings, for detergents and cleaning agents, in foods and as oil field chemicals.

The amphiphilic block copolymers may be added either together with the polymer dispersion, which has been prepared, for example, in the presence of a block copolymer, or together with the paper coating slip during the mixing of the components. Substantial components of paper coating slips are pigments, such as kaolin, clay, calcium carbonate, chalk, titanium dioxide or calcium sulfate, which are dispersed in water, binders, such as polymer dispersions, e.g. aqueous dispersions based on polyacrylates, polymethacrylates, styrene/acrylate copolymers, styrene/butadiene copolymers or vinyl acetate-comprising polymer dispersions, and thickeners. The content of pigments in the paper coating slip is, for example, from 45 to 95% by weight, the binder content is, for example, from 55 to 3% by weight and the content of associative thickeners to be used according to the invention is from 0.01 to 20, preferably from 0.1 to 5, % by weight.

The use of the polymer dispersions to be used according to the invention has the following advantages over the use of conventional thickeners:
(i) improvement of the water retention or of the water retentivity,
(ii) extremely high shear dilution of the aqueous mixture thickened with the amphiphilic block copolymers at shear rates of from 10 000 to 10 million 1/sec and
(iii) avoidance of the subsequent thickening of a stored solution or dispersion, as is usual in the case of the associative thickeners according to the prior art.

Particularly in the case of the three-block copolymers A-B-A composed of PIBSA and PEO, the hydrophobic polymeric blocks act as the associative component which leads to a physical network through the hydrophobic-hydrophobic interaction and thus results in the thickening.

The present invention furthermore relates to the use of amphiphilic block copolymers as the sole stabilizer in the emulsion polymerization of ethylenically unsaturated monomers. Suitable amphiphilic polymers are composed of at least one hydrophobic block A consisting of polyisobutene and at least one hydrophilic block B consisting of polyalkylene oxide or mixtures of these amphiphilic polymers, the stabilizers having at least one of the structures $A_pB_q$, where p and q, independently of one another, are from 1 to 8, and
A being a polyisobutene block having an average molar mass $M_n$ of from 200 to 50 000 and
B being a polyalkylene oxide block having an average molar mass $M_n$ of from 200 to 50 000.

Suitable ethylenically unsaturated monomers are all monomers known for the preparation of polymer dispersions and polymer solutions, e.g. acrylates or monohydric alcohols of 1 to 18 carbon atoms, methacrylates of monohydric alcohols of 1 to 18 carbon atoms, vinyl esters, in particular vinyl acetate and vinyl propionate, α-olefins, such as ethylene, propylene, butenes, diisobutylene and decene, styrene, methylstyrene, butadiene, acrylonitrile, methacrylonitrile and ethylenically unsaturated acids, such as acrylic acid, methacrylic acid, crotonic acid, maleic acid, fumaric acid, itaconic acid, vinylsulfonic acid, acrylamidomethylpropanesulfonic acid and styrenesulfonic acid. For the preparation of binders for paper coating slips, it is preferable to start from acrylates, methacrylates, styrene, butadiene, acrylic acid and/or methacrylic acid as monomers. The most important binders are, for example, aqueous dispersions based on copolymers of ethyl acrylate and butyl acrylate and copolymers of butadiene and styrene. For the preparation of thickeners for paper coating slips, for example, ethylenically unsaturated $C_3$- to $C_5$-carboxylic acids, preferably acrylic acid and/or methacrylic acid, and esters of these acids with monohydric alcohols having 1 to 4 carbon atoms in the molecule are used, for example aqueous dispersions which comprise at least 20% by weight of acrylic acid and/or methacrylic acid and up to 80% by weight of ethyl acrylate incorporated in the form of polymerized units are prepared. The monomers are polymerized either alone or as a mixture with one another in an aqueous medium in the presence of conventional polymerization initiators and conventional emulsifiers or, in the preferred embodiment of the present invention, in the presence of the three-block copolymers described (comprising PIBSA and PEO). As stated at the outset, dispersions which comprise conventional emulsifiers are commercial products.

With the use of the amphiphilic block copolymers—either in the preparation of the aqueous polymer dispersions or with addition of the three-block copolymers to an aqueous polymer dispersion already stabilized with other emulsifiers—stable aqueous polymer dispersions or polymer emulsions are obtained. They comprise from 0.1 to 70, preferably from 0.5 to 20, % by weight, based on polymer, of at least one amphiphilic block copolymer. For further modification, however, conventional emulsifiers may be added to these polymer dispersions.

In the examples which follow, parts and percentages are by weight, unless otherwise evident from the context.

Preparation of the Paper Coating Slip

The paper coating slip had the following composition:
60.0 parts of an aluminum silicate pigment $Al_4[Si_4O_{10}](OH)_8$,
30.0 parts of a magnesium silicate pigment $Mg_3[Si_4O_{10}](OH)_2$,
5.0 parts of Acronal® S 201 from BASF, based on solid (Acronal® S 201 is a binder based on a copolymer of butyl acrylate and styrene)
1.0 part of sodium stearate and additionally the amounts, stated in the examples below, of thickener to be used according to the invention.

The solids content of the paper coating slip was brought to 49% by adding water and the pH was brought to 9.4 to 9.6 with sodium hydroxide solution.

Production of the Coated Paper

The base paper used was a wood-free coating paper from Scheufelen GmbH+Co. KG, D-73250 Lenningen, having a basis weight of 70 g/m². The paper coating slip was applied on one side to give a dry coat thickness of 12 g/m² on a laboratory coating machine with a blade. The moist coat applied was dried using IR lamps.

Determination of the Low-Shear Viscosity

On the basis of the methods according to DIN 51550, DIN 53018, DIN 53019, viscosities of about 1000 mPa·s were measured using a Brookfield viscometer model DV II at a speed of 100 revolutions per minute with spindle No. 4.

Determination of High-Shear Viscosity

The viscosity of the coating slip was measured at shear rates up to 40000 s$^{-1}$ using the Rotovisco RV 20 from Gebrüder Haake GmbH, Dieselstrasse 4, D-76227 Karlsruhe. For this purpose, the apparatus was thermostated at 23° C. and spindle HS 1 was used. The substance was introduced with rotation of the spindle. Measurement was effected under standard conditions, i.e. thermostated for 1 minute without rotor rotation at 23° C., 2 minutes with continuously increasing speed up to the maximum shear gradient, 2 minutes with continuously decreasing speed to shear gradient 0. The high-shear viscosity was determined in the following examples at a shear rate of 37 000 s$^{-1}$.

Determination of Water Retention According to Gradek

The water retention was measured in the pressure filtration apparatus AA-GWR from Abo Akademi-Gravimetric Water Retention, which was obtained from OY Gradek AB, Mariantie 9, SF-02700 Kauniainen, Finland. The filter used was a polycarbonate membrane, 5.0 μm pore size, 47 mm diameter, 100/Pk, from Osmonics Inc., which was obtained from Infiltec GmbH, Alte Rheinhäuser Strasse 8, D-67346 Speyer/

Rhein. The paper used was ashless Schwarzband filter paper, 90 mm diameter, from Schleicher & Schuell, Postfach 4, D-3354 Dassel.

The apparatus was connected to a compressed air line and brought to a pressure of 4 bar. Five filters stapled together and weighed were placed on a rubber sheet, care being taken to ensure that the fifth filter is still dry after the measurement. If not, the number should be increased to 8 or 10. Following a slight projection are a polycarbonate membrane and the metal cylinder with the rubber seal facing upward. The stopper was closed with the lever. A pressure of 0.5 bar was established by pulling out the pressure setting knob. About 5 ml of coating slip were introduced into the metal cylinder. A pressure of 0.5 bar was applied for 60 seconds. The wet filter paper were weighed again. The moisture absorption was multiplied by 1 250. The result is the amount of water released, in g/m².

Thickener 1—Preparation of the Three-Block Copolymer 550/1500/550:

Reaction of $PIBSA_{550}$ (molar mass $M_n$ 550, hydrolysis number HN=162 mg/g KOH) with Pluriol® E1500 (polyethylene oxide, $M_n \approx 1500$)

693 g of PIBSA ($M_n$=684; dispersity index DP=1.7) and 750 g of Pluriol® E1500 were initially taken in a 4 l three-necked flask having an internal thermometer, reflux condenser and nitrogen valve. During heating to 80° C., evacuation was effected three times and $N_2$ was passed in. The reaction mixture was heated to 130° C. and kept at this temperature for 3 hours. The product was then allowed to cool to room temperature. The following spectra were recorded:

IR spectrum (KBr) in cm$^{-1}$:

OH stretching vibration at 3308; C—H stretching vibration at 2953, 2893, 2746; C=O stretching vibration at 1735; C=C stretching vibration at 1 639; further vibrations of the PIB skeleton: 1471, 1390, 1366, 1233; ether vibration of the Pluriol at 1 111.

1-H-NMR spectrum (CDCl$_3$, 500 MHz, TMS, room temperature) in ppm:

4.9-4.7 (C=C of PIBSA); 4.3-4.1 (C(O)—O—CH$_2$—CH$_2$—); 3.8-3.5 (O—CH$_2$—CH$_2$—O, PEO chain); 3.4 (O—CH$_3$); 3.1-2.9; 2.8-2.4; 2.3-2.1; 2.1-0.8 (methylene and methine of the PIB chain)

Thickener 2—Preparation of the Three-Block Copolymer 550/6000/550:

Reaction of $PIBSA_{550}$ (hydrolysis number HN=162 mg/g KOH) with Pluriol® E6000 (polyethylene oxide, $M_n \approx 6000$)

346 g of PIBSA ($M_n$=684; DP=1.7) and 1500 g of Pluriol® E6000 were initially taken in a 4 l three-necked flask having an internal thermometer, reflux condenser and nitrogen valve. During heating to 80° C., evacuation was effected three times and $N_2$ was passed in. The mixture was then heated to 130° C. and kept at this temperature for 3 hours. The product was then allowed to cool to room temperature and was investigated spectroscopically:

IR spectrum (KBr) in cm$^{-1}$:

OH stretching vibration at 3 310; C—H stretching vibration at 2952, 2893, 2743; C=O stretching vibration at 1736; C=C stretching vibration at 1639; further vibrations of the PIB skeleton: 1470, 1389, 1366, 1235; ether vibration of the Pluriol at 1 110.

1-H-NMR spectrum (CDCl$_3$, 500 MHz, TMS, room temperature) in ppm:

Comparable with example 1, different intensities: 4.9-4.7 (C=C of PIBSA); 4.3-4.1 (C(O)—O—CH$_2$—CH$_2$—); 3.8-3.5 (O—CH$_2$—CH$_2$—O, PEO chain); 3.4 (O—CH$_3$); 3.1-2.9; 2.8-2.4; 2.3-2.1; 2.1-0.8 (methylene and methine of the PIB chain)

Thickener 3—Preparation of the Three-Block Copolymer 1000/4000/1000:

Reaction of $PIBSA_{1000}$ (hydrolysis number HN=97 mg/g KOH) with Pluriol® E4000 (polyethylene oxide, $M_n \approx 4000$)

578 g of PIBSA ($M_n$=1157; DP=1.55) and 1000 g of Pluriol® E4000 were initially taken in a 4 l three-necked flask having an internal thermometer, reflux condenser and nitrogen valve. During heating to 80° C., evacuation was effected three times and $N_2$ was passed in. The mixture was then heated to 130° C. and kept at this temperature for 3 hours. The product was then allowed to cool to room temperature and was investigated spectroscopically.

IR spectrum (KBr) in cm$^{-1}$:

OH stretching vibration at 3312; C—H stretching vibration at 2957, 2890, 2744; C=O stretching vibration at 1730; C=C stretching vibration at 1640; further vibrations of the PIB skeleton: 1470, 1388, 1365, 1232; ether vibration of the Pluriol at 1108.

1-H-NMR spectrum (CDCl$_3$, 500 MHz, TMS, room temperature) in ppm:

Comparable with example 1, different intensities: 4.9-4.7 (C=C of PIBSA); 4.3-4.1 (C(O)—O—CH$_2$—CH$_2$—); 3.8-3.5 (O—CH$_2$—CH$_2$—O, PEO chain); 3.4 (O—CH$_3$); 3.1-2.9; 2.8-2.4; 2.3-2.1; 2.1-0.8 (methylene and methine of the PIB chain)

Thickener 4—Preparation of the Three-Block Copolymer 550/12000/550:

Reaction of $PIBSA_{550}$ (hydrolysis number HN=162 mg/g KOH) with Pluriol® E12000 (polyethylene oxide, $M_n \approx 12\,000$)

240 g of PIBSA ($M_n$=684; DP=1.7) and 2100 g of Pluriol® E12000 were initially taken in a 4 l three-necked flask having an internal thermometer, reflux condenser and nitrogen valve. During heating to 80° C., evacuation was effected three times and $N_2$ was passed in. The mixture was then heated to 130° C. and kept at this temperature for 3 hours. The product was then allowed to cool to room temperature and was investigated spectroscopically.

IR spectrum (KBr) in cm$^{-1}$:

OH stretching vibration at 3309; C—H stretching vibration at 2950, 2892, 2744; C=O stretching vibration at 1738; C=C stretching vibration at 1640; further vibrations of the PIB skeleton: 1471, 1389, 1367, 1234; ether vibration of the Pluriol at 1111.

1-H-NMR spectrum (CDCl$_3$, 500 MHz, TMS, room temperature) in ppm:

Comparable with example 1, different intensities: 4.9-4.7 (C=C of PIBSA); 4.3-4.1 (C(O)—O—CH$_2$—CH$_2$—); 3.8-3.5 (O—CH$_2$—CH$_2$—O, PEO chain); 3.4 (O—CH$_3$); 3.1-2.9; 2.8-2.4; 2.3-2.1; 2.1-0.8 (methylene and methine of the PIB chain)

Preparation of an Aqueous Dispersion of Thickener 2

(three-block copolymer 550/6000/550 as thickener 2) having a solids content of 15%

A 15% strength aqueous dispersion was prepared in a 4 l four-necked flask having an internal thermometer, reflux condenser and heated dropping funnel. For this purpose, 448.0 g of thickener 2 (three-block copolymer 550/6000/550) were first melted at 100° C. Water (2 540 g) thermostated at 90° C.

was then added as rapidly as possible with stirring. The mixture was then stirred for about 3 hours at 90° C. It was then cooled to room temperature.

COMPARATIVE EXAMPLE 1

Preparation of a Thickener Using Conventional Stabilizers

The copolymer preparation was effected according to the method described below. The resulting aqueous polymer dispersion contained the copolymers in their acid form.

In a stirred apparatus consisting of a 4 liter four-necked flask having a paddle stirrer (150 rpm), reflux condenser, internal thermocouple and metering station, 145.0 g of demineralized water, 272.0 g of a degraded starch dissolved in water, C*Pur 01998 from Cerestar, having a solids content of 50%, and 1.511 g of the emulsifier Dowfax 2A1 were mixed to give the initially taken mixture.

2.429 g of a 7% strength aqueous sodium peroxodisulfate solution were added to this solution at 80° C., and the mixture was stirred at 80° C. for 5 minutes. Thereafter, at 80° C. with further stirring, the emulsion consisting of 1000.639 g of demineralized water, the monomers (263.673 g of methacrylic acid, 40.8 g of acrylic acid and 299.2 g of ethyl acrylate, 20.4 g of Lutensol AT 25 methacrylate, 61.2 g of methyl methacrylate) and the emulsifiers (6.044 g of Dowfax 2A1, 45% strength in water, and 34.0 g of Steinapol NLS, 15% strength in water) was metered in uniformly in the course of 2 hours and at the same time 24.286 g of 7% strength aqueous sodium peroxodisulfate solution and 33.99 g of 2% strength ascorbic acid were metered in uniformly in the course of 2.25 hours. Thereafter, the reaction mixture was stirred for a further 15 minutes at 80° C. and then brought to room temperature. At room temperature, 22.66 g of a 3% strength hydrogen peroxide solution and 0.43 g of a 4% strength Dissolvine E-FE-6 solution (iron(II) salt solution) were added and 51 g of a 2% strength ascorbic acid solution were metered in uniformly in the course of 1 hour. An aqueous polymer dispersion having a solids content of 36% was obtained.

The parts by weight stated in the table below, calculated as solid, of the thickener dispersion prepared in this manner were added to the coating slip, as described above, and the coated paper was produced therefrom, likewise as described above. The individual examples and the results are summarized in table 1.

EXAMPLE 1

Novel Thickener Dispersion Comprising Three-Block Copolymers 550/12000/550

The copolymer preparation was effected according to the method described below. The resulting aqueous polymer dispersion comprised the copolymers in their acid form.

In a stirred apparatus consisting of a 4 liter four-necked flask having a paddle stirrer (150 rpm), reflux condenser, internal thermocouple and metering station, the following components were introduced as an initially taken mixture: 509.536 g of demineralized water, 52.5 g of polyvinyl alcohol (Mowiol 5/88), 0.175 g of the iron catalyst Dissolvine E-FE 4% strength and 350.0 g of the thickener 4, and were dispersed, analogously to the method described above for thickener 2, to give a solids content of 5%. The mixture was then heated to 60° C., the polyvinyl alcohol dissolving.

7 g of a 2.5% strength sodium peroxodisulfate were added to this solution at 60° C., and the mixture was stirred at 60° C. for 5 minutes. Thereafter, at 60° C. with further stirring, the emulsion consisting of 572.632 g of demineralized water, the monomers (117.857 g of methacrylic acid, 38.5 g of acrylic acid, 196 g of ethyl acrylate) and 23.33 g of the emulsifier Steinapol NLS (15% strength) was metered in uniformly in the course of 2.5 hours and at the same time 35 g of 1% strength hydrogen peroxide and 14 g of 1% strength ascorbic acid were metered in uniformly in the course of 2.75 hours. Thereafter, the reaction mixture was stirred for a further 15 minutes at 60° C. and then brought to room temperature. At room temperature, 35 g of 1% strength hydrogen peroxide solution and 70 g of a 1% strength ascorbic acid solution were metered in uniformly in the course of 1 hour. An aqueous polymer dispersion having a solids content of 21% was obtained. The parts by weight stated in the table below, calculated as solid, of the thickener dispersion prepared in this manner were added to the coating slip, as described above, and coated paper was produced therefrom, likewise as described above. The individual examples and the results are summarized in the table.

EXAMPLE 2

Novel Thickener Dispersion Comprising Three-Block Copolymers 550/6000/550

Example 1 was repeated, with the only exception that now the thickener 2 was used instead of the thickener 4. The results obtained therewith are shown in the table.

EXAMPLE 3

Novel Thickener Dispersion Comprising Three-Block Copolymers 550/1500/550

The copolymer preparation was effected according to the method described below. The resulting aqueous polymer dispersion comprised the copolymers in their acid form.

In a stirred apparatus consisting of a 4 liter four-necked flask having a paddle stirrer (150 rpm), reflux condenser, internal thermocouple and metering station, 436.154 g of demineralized water, 12.5 g of polyvinyl alcohol (Mowiol 5/88), 0.125 g of the iron catalyst Dissolvine E-FE, 4% strength, and 62.5 g of the thickener 1 described above, which had been dispersed beforehand to give a solids content of 20% by adding water, were initially taken. The mixture was then heated to 60° C., the polyvinyl alcohol dissolving. 3.75 g of 1% strength hydrogen peroxide and 5 g of 1% strength ascorbic acid were then added to this solution at 60° C., and the mixture was stirred at 60° C. for 5 minutes. Thereafter, at 60° C. with further stirring, the emulsion consisting of 404.036 g of demineralized water, the monomers (84.184 g of methacrylic acid, 27.5 g of acrylic acid, 140 g of ethyl acrylate) and 8.621 g of the emulsifier alkylsuccinic anhydride (58% strength) was metered in uniformly in the course of 2.5 hours and at the same time 33.75 g of 1% strength hydrogen peroxide and 45 g of 1% strength ascorbic acid were metered in uniformly in the course of 2.75 hours. Thereafter, the reaction mixture was stirred for a further 15 minutes at 60° C. and then brought to room temperature. At room temperature, 25 g of a 1% strength hydrogen peroxide solution and 50 g of a 1% strength ascorbic acid solution were then metered in uniformly in the course of 1 hour. An aqueous polymer dispersion having a solids content of 21% was obtained. The parts by weight stated in the table below, calculated as solid, of the thickener dispersion prepared in this manner were added to the coating slip, as described above, and the coated paper was produced therefrom, likewise as described above. The individual examples and the results are summarized in the table.

EXAMPLE 4

Novel Thickener Dispersion Comprising Three-Block Copolymers 1000/4000/1000

Example 3 was repeated with the only exception that the thickener 1 was now replaced by the thickener 3. The results are shown in the table.

TABLE

Evaluation of the water retention and of the thickening performance

|  | Comparison 1 | Example 1 | Example 2 | Example 3 | Example 4 |
|---|---|---|---|---|---|
| Thickener in the coating slip (%) | 0.5 | 0.4 550/12000/550 | 0.5 550/6000/550 | 0.6 550/1500/550 | 0.7 1000/4000/1000 |
| Brookfield viscosity, immediately (mPa · s) | 950 | 950 | 950 | 950 | 950 |
| Brookfield viscosity, after 1 h (mPa · s) | 1260 | 950 | 1000 | 1040 | 1150 |
| Water retention Gradek (g/m$^2$) | 70 | 60 | 65 | 70 | 60 |

We claim:

1. An aqueous polymer dispersion obtained by emulsion polymerization of ethylenically unsaturated monomers in an aqueous medium in the presence of at least one free radical polymerization initiator and at least one stabilizer;
wherein:
the at least one stabilizer is employed before, during or after polymerization;
the at least one stabilizer comprises at least one amphiphilic polymer comprising one or more hydrophobic units A and one or more hydrophilic units B;
the one or more hydrophobic units A are formed from a polyisobutene block, at least 50 mol % of polyisobutene macromolecules of the polyisobutene block having terminally arranged double bonds, based on a total number of polyisobutene macromolecules;
the one or more hydrophilic units B are formed from at least one alkylene oxide selected from the group consisting of monoaminoethylene oxide, monothioethylene oxide, and diaminoethylene oxide; and
the at least one amphiphilic polymer has an ABA structure.

2. The aqueous polymer dispersion according to claim 1, comprising from 0.1 to 70% by weight of the at least one amphiphilic polymer.

3. The aqueous polymer dispersion according to claim 1, wherein at least 60 mol % of polyisobutene macromolecules of the polyisobutene block have terminally arranged double bonds, based on the total number of polyisobutene macromolecules.

4. The aqueous polymer dispersion according to claim 1, wherein:
the polyisobutylene block is functionalized by introduction of polar groups; and
the functionalized polyisobutene block is optionally further modified.

5. The aqueous polymer dispersion according to claim 4, wherein the polyisobutene block is functionalized by at least one reaction selected from the group consisting of:
i) reaction with aromatic hydroxy compounds in the presence of an alkylation catalyst to give aromatic hydroxy compounds alkylated with polyisobutenes,
ii) reaction of the polyisobutene block with a peroxy compound to give an epoxidized polyisobutene,
iii) reaction of the polyisobutene block with an alkene which has a double bond substituted by electron-attracting groups (enophile), in an ene reaction,
iv) reaction of the polyisobutene block with carbon monoxide and hydrogen in the presence of a hydroformylation catalyst to give a hydroformylated polyisobutene,
v) reaction of the polyisobutene block with a phosphorus halide or a phosphorus oxychloride to give a polyisobutene functionalized with phosphono groups,
vi) reaction of the polyisobutene block with a borane and subsequent oxidative cleavage to give a hydroxylated polyisobutene,
vii) reaction of the polyisobutene block with an SO$_3$ source, preferably acetyl sulfate or oleum, to give a polyisobutene having terminal sulfo groups, and
viii) reaction of the polyisobutene block with oxides of nitrogen and subsequent hydrogenation to give a polyisobutene having terminal amino groups.

6. The aqueous polymer dispersion according to claim 1, wherein the at least one amphiphilic polymer is obtained by reacting hydrophobic units A comprising a functionalized polyisobutene block with alkylene oxides or by a polymer-analogous reaction with one or more polyalkylene oxides.

7. The aqueous polymer dispersion according to claim 1, comprising from 0.1 to 70% by weight of blends of amphiphilic polymers.

8. The aqueous polymer dispersion according to claim 1, comprising from 0.5 to 20% by weight of the at least one amphiphilic polymer.

9. The aqueous polymer dispersion according to claim 1, wherein:
the at least one hydrophobic block A consists of polyisobutene;
the at least one hydrophilic block B consists of at least one alkylene oxide selected from the group consisting of monoaminoethylene oxide, monothioethylene oxide, and diaminoethylene oxide;

A is a polyisobutene block having an average molar mass $M_n$ of from 200 to 50,000; and B is a polyalkylene oxide block having an average molar mass $M_n$ of from 200 to 50,000.

10. The aqueous polymer dispersion according to claim 1, wherein:

A is a polyisobutene block having an average molar mass $M_n$ of from 200 to 50,000; and B is a polyalkylene oxide block having an average molar mass $M_n$ of from 200 to 50,000.

11. The aqueous polymer dispersion according to claim 1, wherein:

A is a polyisobutene block having an average molar mass $M_n$ of from 200 to 20,000; and B is a polyalkylene oxide block having an average molar mass $M_n$ of from 500 to 30,000.

12. The aqueous polymer dispersion according to claim 1, wherein:

A is a polyisobutene block having an average molar mass $M_n$ of from 450 to 5,000; and B is a polyalkylene oxide block having an average molar mass $M_n$ of from 800 to 15,000.

13. The aqueous polymer dispersion according to claim 1, wherein:

A is a polyisobutene block having an average molar mass $M_n$ of from 450 to 5,000;

B is a polyalkylene oxide block having an average molar mass $M_n$ of from 800 to 15,000; and the polyisobutene block comprises polyisobutene functionalized with succinic anhydride groups (PIBSA).

14. A process for preparing the aqueous polymer dispersion according to claim 1, comprising:

polymerizing ethylenically unsaturated monomers in the aqueous medium in the presence of the at least one free radical polymerization initiator and the at least one stabilizer by an emulsion polymerization method;

wherein:

the at least one stabilizer is employed before, during or after the polymerization;

at least 50 mol % of the hydrophobic units A are polyisobutene macromolecules having terminally arranged double bonds.

15. The process according to claim 14, wherein:

A is a polyisobutene block having an average molar mass $M_n$ of from 200 to 50,000; and B is a polyalkylene oxide block having an average molar mass $M_n$ of from 200 to 50,000.

16. The process according to claim 14, wherein:

A is a polyisobutene block having an average molar mass $M_n$ of from 200 to 20,000; and B is a polyalkylene oxide block having an average molar mass $M_n$ of from 500 to 30,000.

17. The process according to claim 14, wherein:

A is a polyisobutene block having an average molar mass $M_n$ of from 450 to 5,000; and B is a polyalkylene oxide block having an average molar mass $M_n$ of from 800 to 15,000.

18. The process according to claim 14, wherein:

A is a polyisobutene block having an average molar mass $M_n$ of from 450 to 5,000;

B is a polyalkylene oxide block having an average molar mass $M_n$ of from 800 to 15,000; and the polyisobutene block comprises polyisobutene functionalized with succinic anhydride groups (PIBSA).

19. An associative thickener for aqueous media, comprising the aqueous polymer dispersion according to claim 1.

20. A paper coating slip, comprising the aqueous polymer dispersion according to claim 1.

21. The paper coating slip according to claim 20, wherein:

the at least one hydrophobic block A consists of polyisobutene;

the at least one hydrophilic block B consists of at least one alkylene oxide selected from the group consisting of monoaminoethylene oxide, monothioethylene oxide, and diaminoethylene oxide;

A is a polyisobutene block having an average molar mass $M_n$ of from 200 to 50,000; and B is a polyalkylene oxide block having an average molar mass $M_n$ of from 200 to 50,000.

22. The aqueous polymer dispersion according to claim 1, wherein at least 80 mol % of polyisobutene macromolecules of the polyisobutene block have terminally arranged double bonds, based on the total number of polyisobutene macromolecules.

23. An aqueous polymer dispersion obtained by emulsion polymerization of ethylenically unsaturated monomers in an aqueous medium in the presence of at least one free radical polymerization initiator and at least one stabilizer;

wherein:

the at least one stabilizer is employed before, during or after polymerization;

the at least one stabilizer comprises at least one amphiphilic polymer comprising one or more hydrophobic units A and one or more hydrophilic units B;

the one or more hydrophobic units A are formed from a polyisobutene block, at least 50 mol % of polyisobutene macromolecules of the polyisobutene block have terminally arranged double bonds; and the at least one amphiphilic polymer has an ABA structure.

24. The aqueous polymer dispersion according to claim 23, comprising from 0.1 to 70% by weight of the at least one amphiphilic polymer.

25. The aqueous polymer dispersion according to claim 23, wherein at least 60 mol % of polyisobutene macromolecules of the polyisobutene block have terminally arranged double bonds, based on the total number of polyisobutene macromolecules.

26. The aqueous polymer dispersion according to claim 23, wherein at least 80 mol % of polyisobutene macromolecules of the polyisobutene block have terminally arranged double bonds, based on the total number of polyisobutene macromolecules.

27. The aqueous polymer dispersion according to claim 23, wherein the one or more hydrophilic units B are formed from repeating ethylene oxide or ethylene oxide/propylene oxide units.

28. The aqueous polymer dispersion according to claim 27, wherein the one or more hydrophilic units B comprise up to 50% by weight of propylene oxide units.

29. The aqueous polymer dispersion according to claim 23, wherein the one or more hydrophilic units B are formed from the following formula

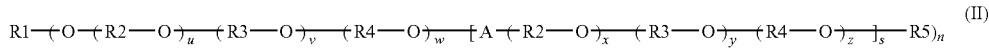

(II)

where, independently from one another,
R$^1$ is hydrogen, C$_1$-C$_{24}$-alkyl, R$^6$—C(=O)—, R$^6$NH—C(O)— or a polyalcohol radical;
R$^5$ is hydrogen, C$_1$-C$_{24}$alkyl, R$^6$—C(=O)— or R$^6$NH—C(=O)—;
R$^2$ to R$^4$ to are —(CH$_2$)$_2$—, —(CH$_2$)$_3$, —(CH$_2$)$_4$—, —CH$_2$—CH(R$^6$)—, —CH$_2$—CHOR$^7$—CH$_2$—;
R$^6$ is C$_1$-C$_{24}$-alkyl;
R$^7$ is hydrogen, C$_1$-C$_{24}$alkyl, R$^6$—C(=O)— or R$^6$—NH—C(=O)—;
A is —C(=O)—O, —C(=O)-D—C(=O)—O, —CH$_2$—CH(—OH)-D-CH(—OH)—CH$_2$—O, —C(=O)—NH-D-NH—C(=O)—O;

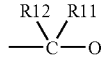

D is (CH$_2$)$_t$—, arylene, substituted or unsubstituted;
R$^{11}$ and R$^{12}$ are hydrogen, C$_1$-C$_{24}$-alkyl, C$_1$-C$_{24}$-hydroxyalkyl, benzyl or phenyl;
n is 1 if R$^1$ is not a polyalcohol radical or is from 1 to 500 if R$^1$ is a polyalcohol radical;
s is from 0 to 1,000;
t is from 1 to 12;
u is from 1 to 2,000;
v is from 0 to 2,000;
w is from 0 to 2,000;
x is from 0 to 2,000;
y is from 0 to 2,000; and
z is from 0 to 2,000.

30. The aqueous polymer dispersion according to claim 23, wherein the one or more hydrophilic units B are formed from at least one alkylene oxide selected from the group consisting of monoaminoethylene oxide, monothioethylene oxide, and diaminoethylene oxide.

31. The aqueous polymer dispersion according to claim 23, wherein:
the polyisobutylene block is functionalized by introduction of polar groups; and
the functionalized polyisobutene block is optionally further modified.

32. The aqueous polymer dispersion according to claim 31, wherein the polyisobutene block is functionalized by at least one reaction selected from the group consisting of:
i) reaction with aromatic hydroxy compounds in the presence of an alkylation catalyst to give aromatic hydroxy compounds alkylated with polyisobutenes,
ii) reaction of the polyisobutene block with a peroxy compound to give an epoxidized polyisobutene,
iii) reaction of the polyisobutene block with an alkene which has a double bond substituted by electron-attracting groups (enophile), in an ene reaction,
iv) reaction of the polyisobutene block with carbon monoxide and hydrogen in the presence of a hydroformylation catalyst to give a hydroformylated polyisobutene,
v) reaction of the polyisobutene block with a phosphorus halide or a phosphorus oxychloride to give a polyisobutene functionalized with phosphono groups,
vi) reaction of the polyisobutene block with a borane and subsequent oxidative cleavage to give a hydroxylated polyisobutene,
vii) reaction of the polyisobutene block with an SO$_3$ source, preferably acetyl sulfate or oleum, to give a polyisobutene having terminal sulfo groups, and
viii) reaction of the polyisobutene block with oxides of nitrogen and subsequent hydrogenation to give a polyisobutene having terminal amino groups.

33. The aqueous polymer dispersion according to claim 23, wherein the at least one amphiphilic polymer is obtained by reacting hydrophobic units A comprising a functionalized polyisobutene block with alkylene oxides or by a polymer-analogous reaction with one or more polyalkylene oxides.

34. The aqueous polymer dispersion according to claim 23, comprising from 0.1 to 70% by weight of blends of amphiphilic polymers.

35. The aqueous polymer dispersion according to claim 23, comprising from 0.5 to 20% by weight of the at least one amphiphilic polymer.

36. The aqueous polymer dispersion according to claim 23, wherein:
A is a polyisobutene block having an average molar mass M$_n$ of from 200 to 50,000; and
B is a polyalkylene oxide block having an average molar mass M$_n$ of from 200 to 50,000.

37. The aqueous polymer dispersion according to claim 23, wherein:
A is a polyisobutene block having an average molar mass M$_n$ of from 200 to 20,000; and
B is a polyalkylene oxide block having an average molar mass M$_n$ of from 500 to 30,000.

38. The aqueous polymer dispersion according to claim 23, wherein:
A is a polyisobutene block having an average molar mass M$_n$ of from 450 to 5,000; and
B is a polyalkylene oxide block having an average molar mass M$_n$ of from 800 to 15,000.

39. The aqueous polymer dispersion according to claim 23, wherein:
A is a polyisobutene block having an average molar mass M$_n$ of from 450 to 5,000;
B is a polyalkylene oxide block having an average molar mass M$_n$ of from 800 to 15,000; and
the polyisobutene block comprises polyisobutene functionalized with succinic anhydnde groups (PIBSA).

40. A process for preparing the aqueous polymer dispersion according to claim 23, comprising:
polymerizing ethylenically unsaturated monomers in the aqueous medium in the presence of the at least one free radical polymerization initiator and the at least one stabilizer by an emulsion polymerization method;
wherein:
the at least one stabilizer is employed before, during or after the polymerization;
at least 50 mol % of the hydrophobic units A are polyisobutene macromolecules having terminally arranged double bonds.

41. The process according to claim 40, wherein:

A is a polyisobutene block having an average molar mass $M_n$ of from 200 to 20,000; and B is a polyalkylene oxide block having an average molar mass $M_n$ of from 500 to 30,000.

42. The process according to claim 40, wherein:

A is a polyisobutene block having an average molar mass $M_n$ of from 450 to 5,000; and B is a polyalkylene oxide block having an average molar mass $M_n$ of from 800 to 15,000.

43. The process according to claim 40, wherein:

A is a polyisobutene block having an average molar mass $M_n$ of from 450 to 5,000;

B is a polyalkylene oxide block having an average molar mass $M_n$ of from 800 to 15,000; and the polyisobutene block comprises polyisobutene functionalized with succinic anhydride groups (PIBSA).

44. An associative thickener for aqueous media, comprising the aqueous polymer dispersion according to claim 23.

45. A paper coating slip, comprising the aqueous polymer dispersion according to claim 23.

* * * * *